Aug. 19, 1947.   E. C. BUNNELL   2,425,726
CONTINUOUS OPERATION MULTISPINDLE MACHINE
Filed April 29, 1942   13 Sheets-Sheet 1

INVENTOR
Earl C. Bunnell
BY
Wooster & Davis
ATTORNEYS.

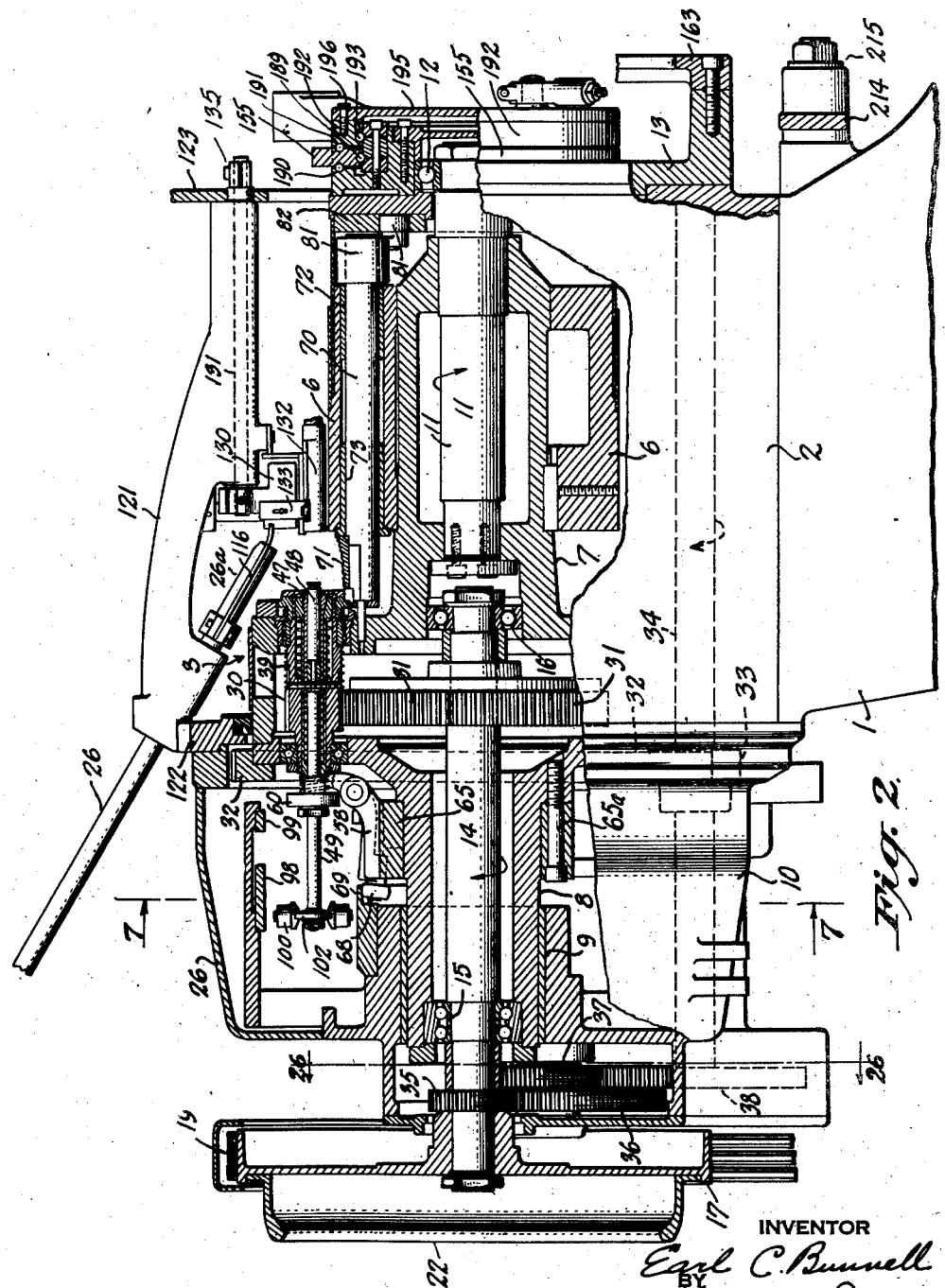

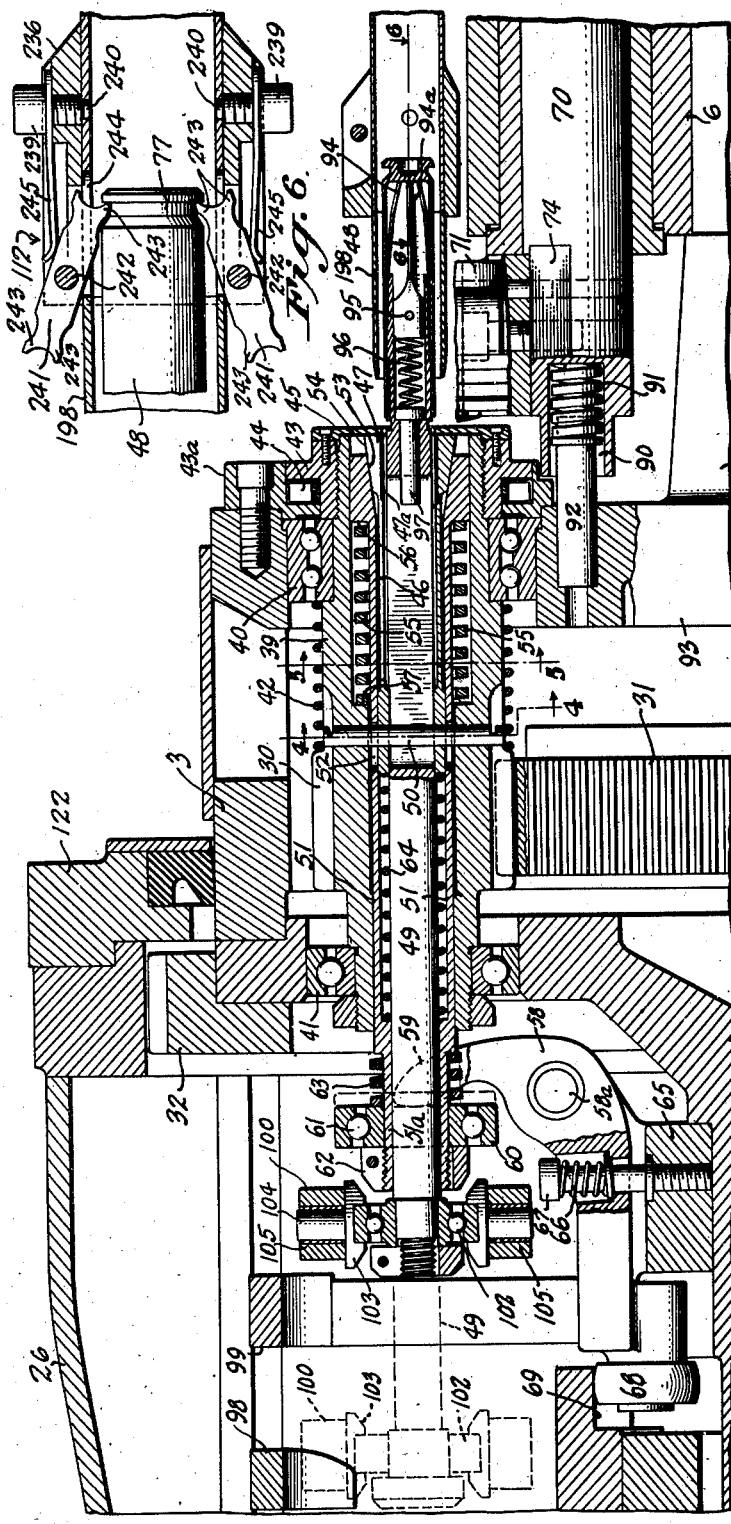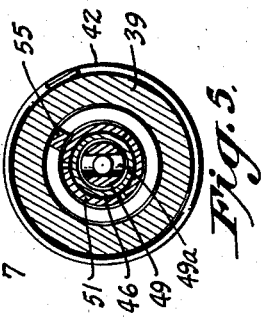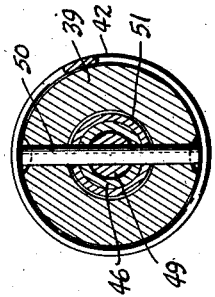

Aug. 19, 1947.  E. C. BUNNELL  2,425,726
CONTINUOUS OPERATION MULTISPINDLE MACHINE
Filed April 29, 1942   13 Sheets-Sheet 4

INVENTOR
Earl C. Bunnell
BY
Wooster & Davis
ATTORNEYS

Aug. 19, 1947.　　　　E. C. BUNNELL　　　　2,425,726
CONTINUOUS OPERATION MULTISPINDLE MACHINE
Filed April 29, 1942　　　13 Sheets-Sheet 5
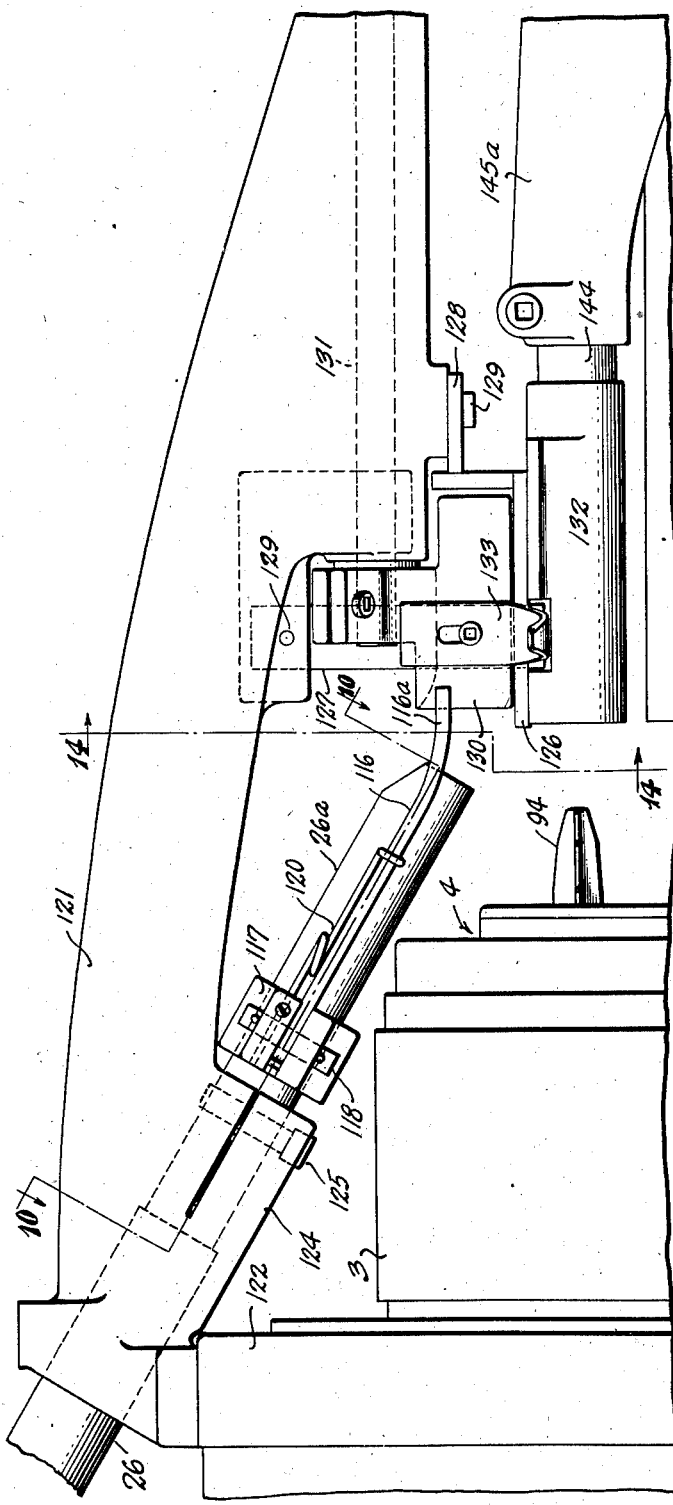
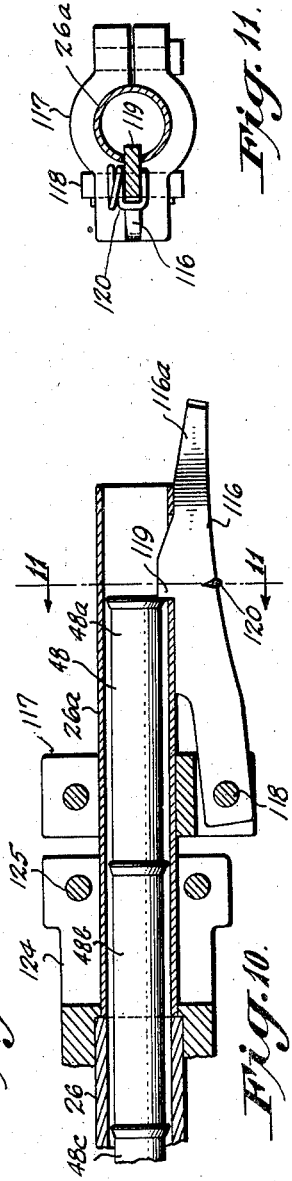
INVENTOR
Earl C. Bunnell
BY
Wooster & Davis
ATTORNEYS

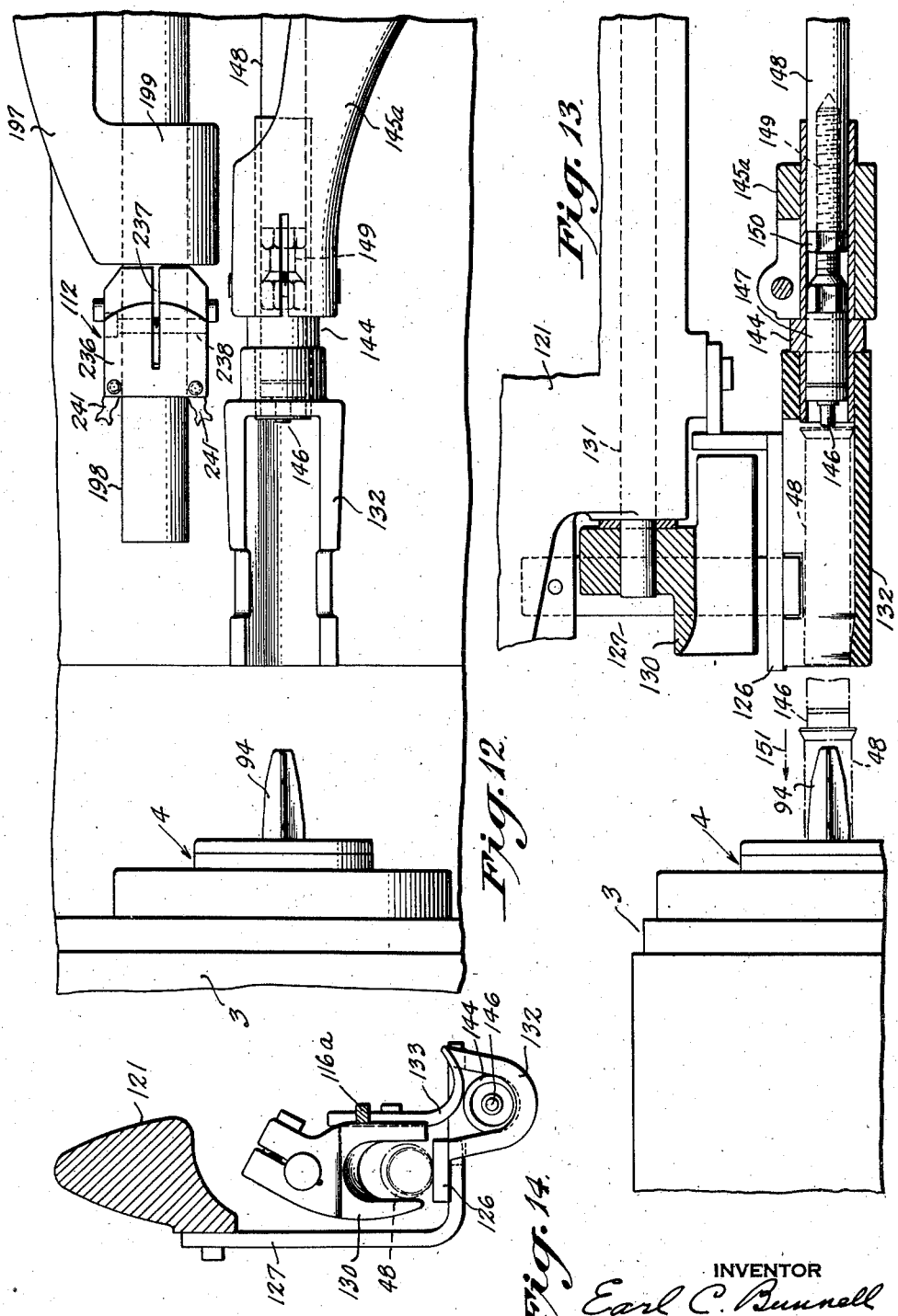

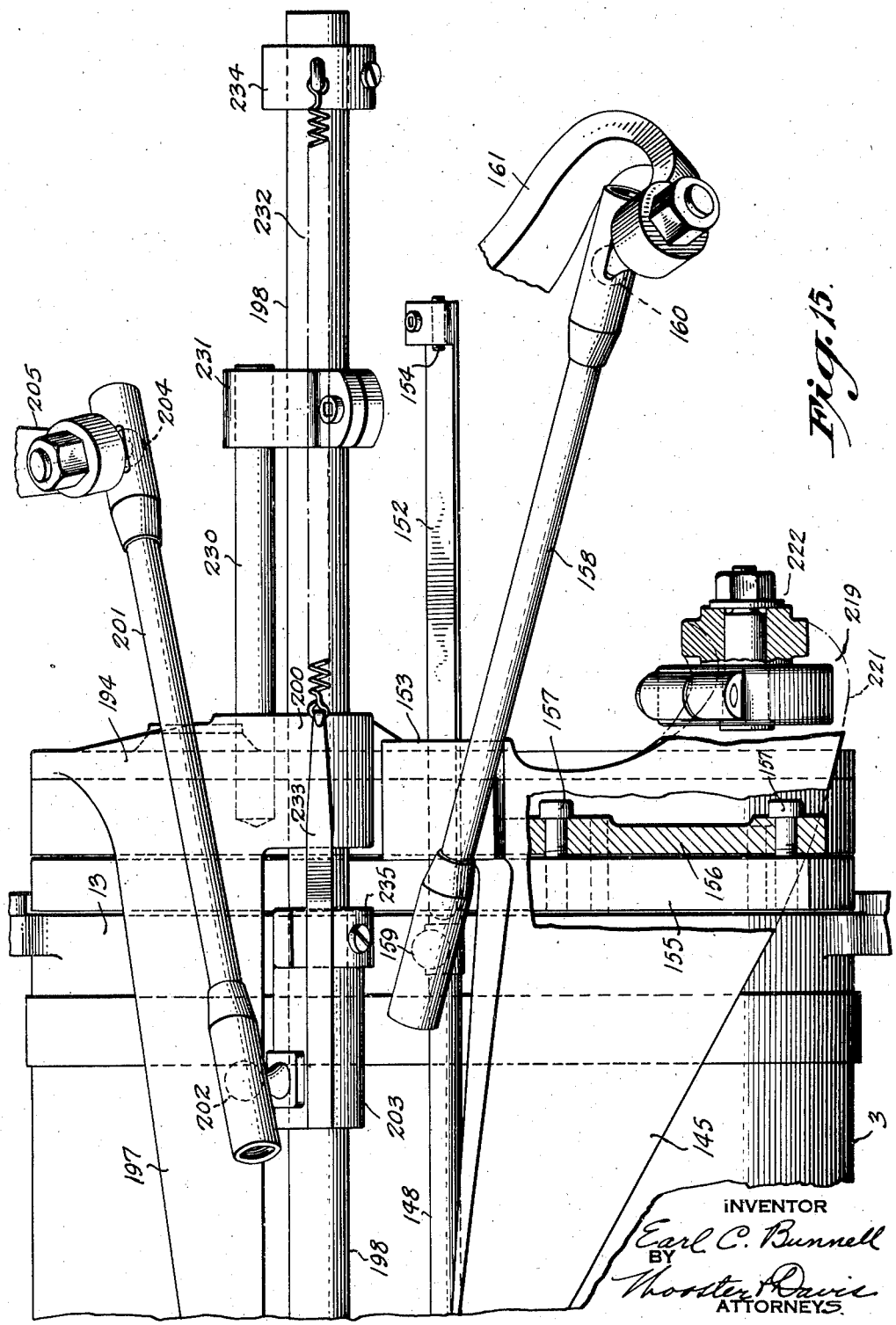

Aug. 19, 1947. E. C. BUNNELL 2,425,726
CONTINUOUS OPERATION MULTISPINDLE MACHINE
Filed April 29, 1942 13 Sheets-Sheet 8
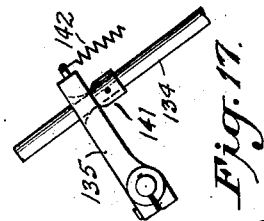
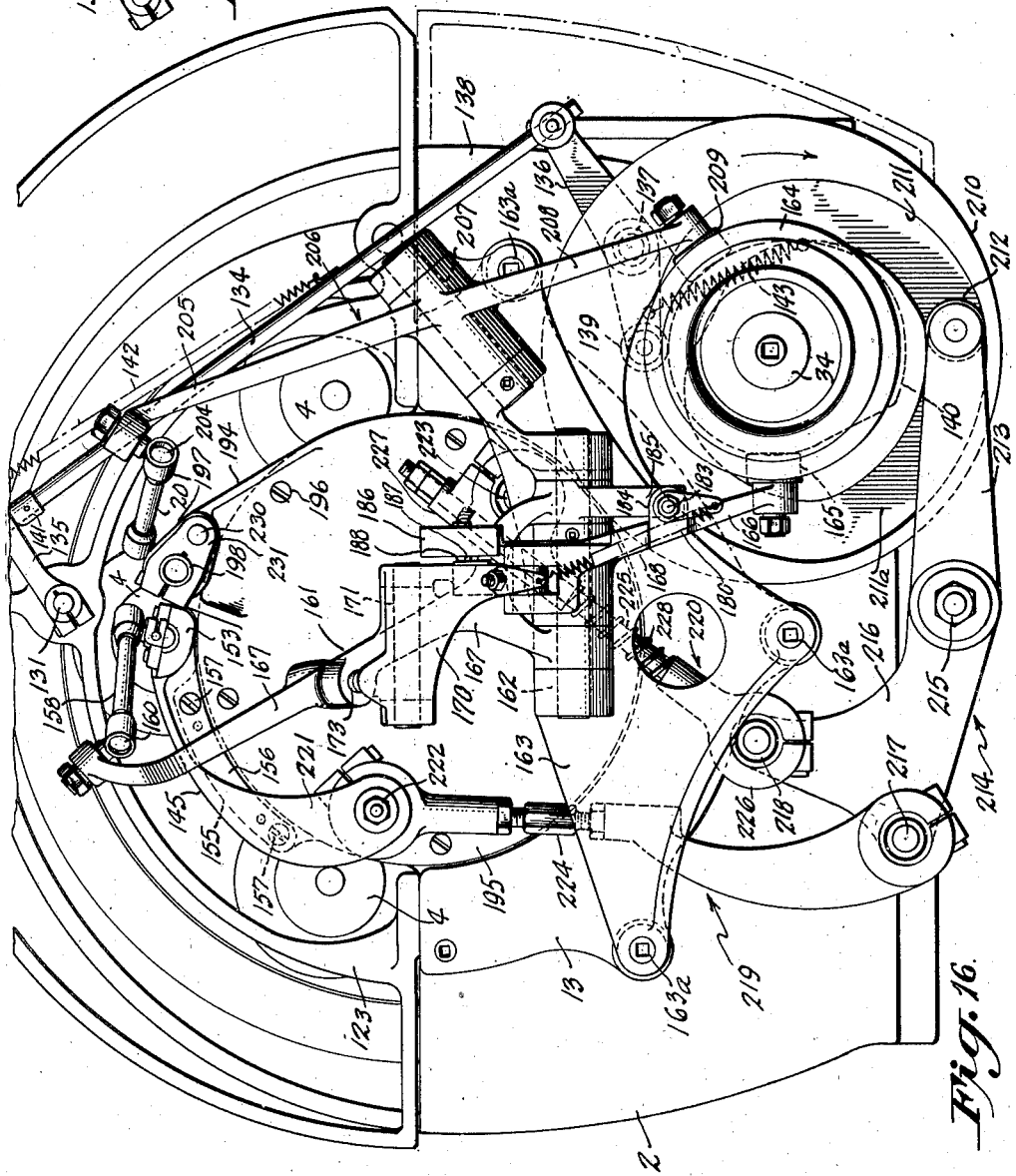
INVENTOR
Earl C. Bunnell
BY
Wooster & Davis
ATTORNEYS

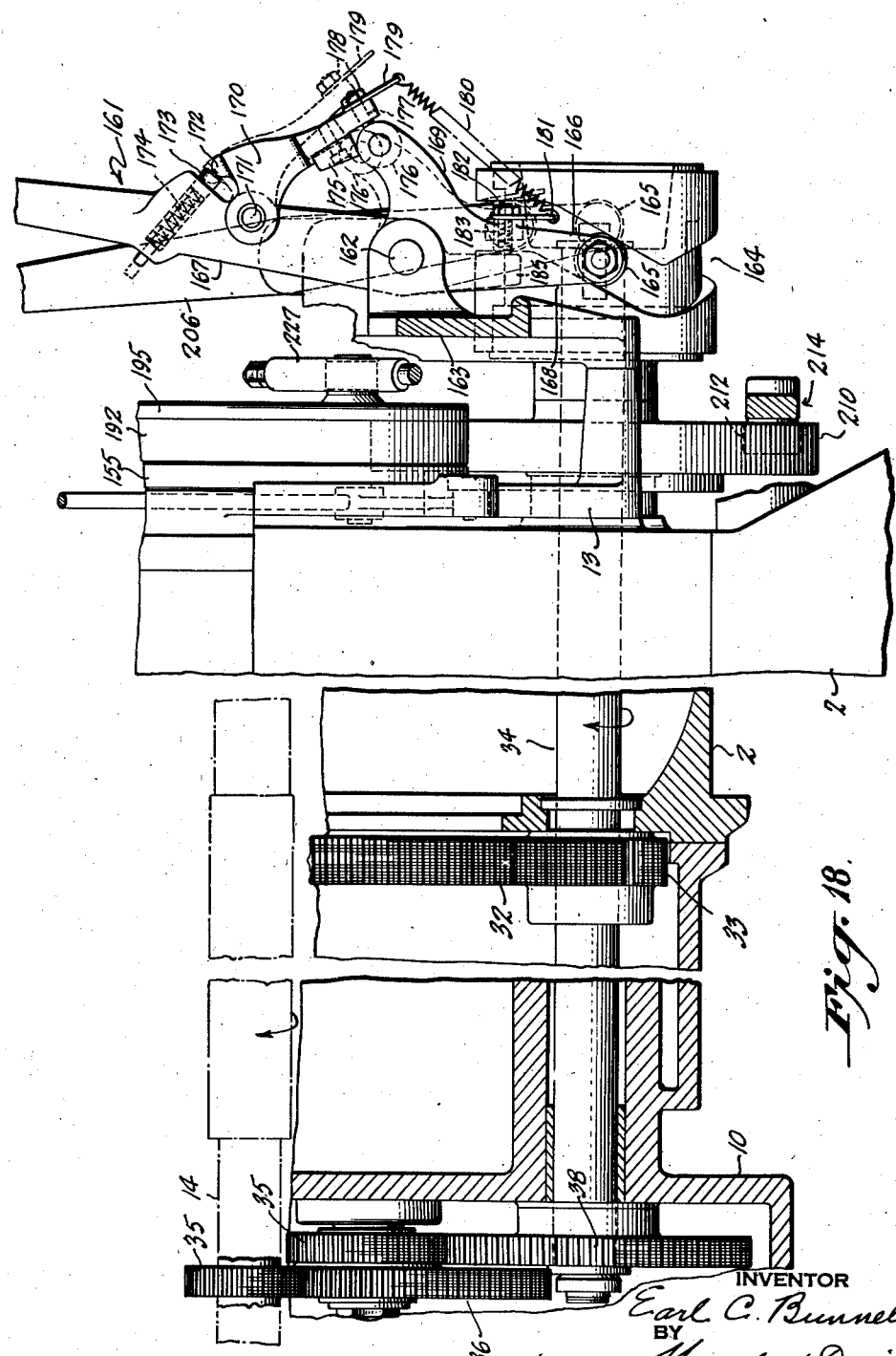

Aug. 19, 1947.  E. C. BUNNELL  2,425,726
CONTINUOUS OPERATION MULTISPINDLE MACHINE
Filed April 29, 1942  13 Sheets-Sheet 11

INVENTOR
Carl C. Bunnell
BY
Wooster & Davis
ATTORNEYS

Aug. 19, 1947.　　　　E. C. BUNNELL　　　　2,425,726
CONTINUOUS OPERATION MULTISPINDLE MACHINE
Filed April 29, 1942　　　13 Sheets-Sheet 12
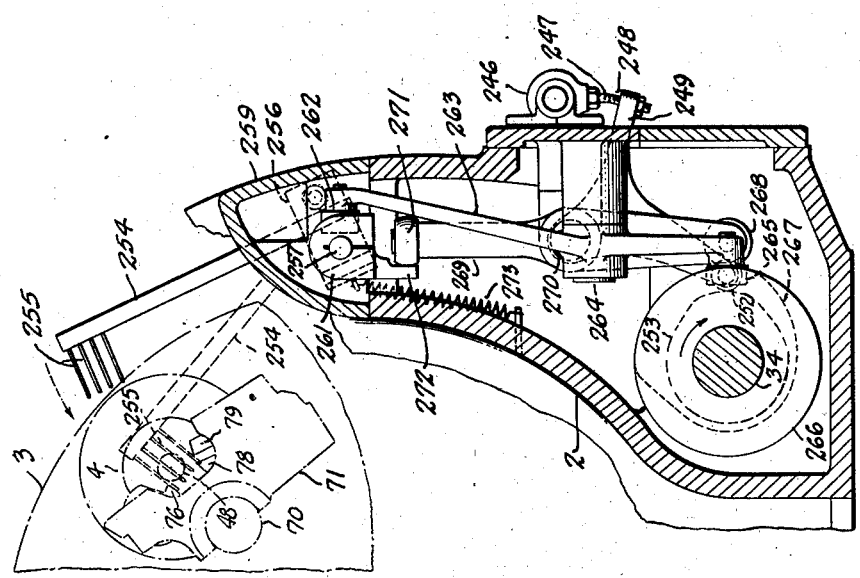
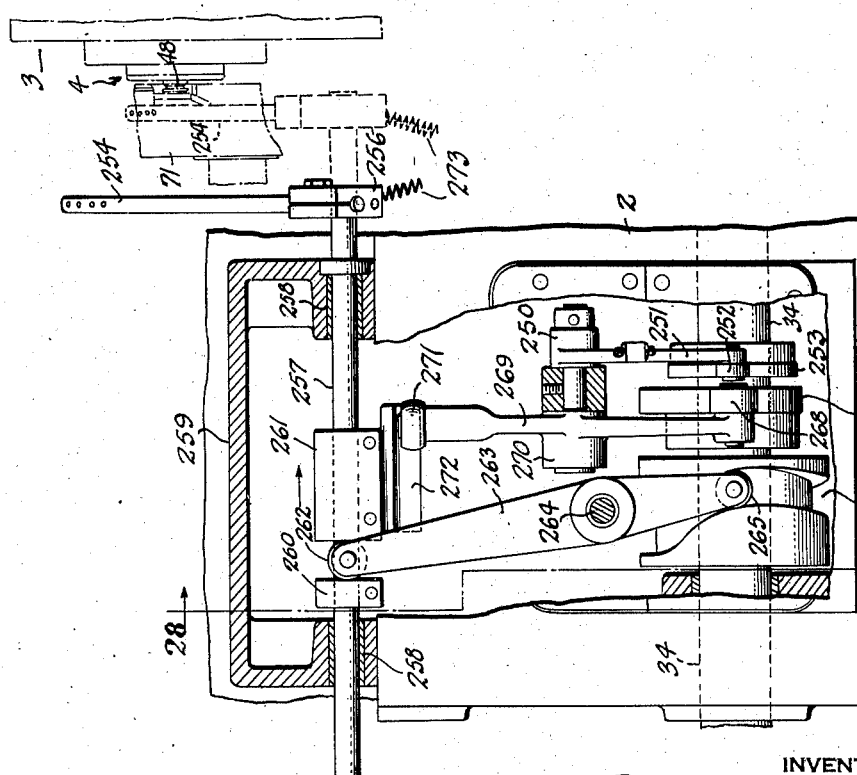
INVENTOR
Earl C. Bunnell
BY
Wooster M Davis
ATTORNEYS.

Aug. 19, 1947.     E. C. BUNNELL     2,425,726
CONTINUOUS OPERATION MULTISPINDLE MACHINE
Filed April 29, 1942     13 Sheets-Sheet 13

INVENTOR
Earl C. Bunnell
BY
Wooster & Davis
ATTORNEYS

Patented Aug. 19, 1947

2,425,726

UNITED STATES PATENT OFFICE 2,425,726

CONTINUOUS OPERATION MULTISPINDLE MACHINE

Earl C. Bunnell, Stratford, Conn., assignor to The Baird Machine Company, Stratford, Conn., a corporation of Connecticut Application April 29, 1942, Serial No. 440,985

51 Claims. (Cl. 29—38)

This invention relates to an automatic multispindle machine in which the work carrying spindles are mounted in a rotating turret, with means for performing one or more operations on work pieces in succession, and has for an object to provide such a machine in which the operations are performed on the work by the machine as a continuous operation.

It is also an object of the invention to provide a machine in which the work pieces are fed to and removed from the chucks on the carrying spindles while the turret and the spindles are rotating, thus eliminating the operations of stopping and starting the turret and the spindles during the loading and unloading operations, greatly increasing the capacity of the machine and also eliminating strain on the machine incident to the indexing operation where the turret and all parts carried thereby must be stopped and started during each indexing operation, and also where the spindles must be stopped and started for removing and inserting the work pieces.

It is another object of the invention to locate and arrange the turret with its spindles and the loading and unloading mechanism to facilitate the loading and unloading operations and make them more accurate and reliable.

Another object is to provide an improved means of relieving the loading means or rendering it inoperative if resistance to insertion of the article in the chuck becomes too great, and stopping the machine without breaking any element of the machine which must be replaced to again place the machine in condition for operation.

With the foregoing and other objects in view I have devised the construction illustrated in the accompanying drawings forming a part of this specification. It is, however, to be understood the invention is not limited to the specific construction and arrangement shown but may embody various changes and modifications within the scope of the invention.

In these drawings:

Fig. 2 is a partial side elevation and partial longitudinal vertical section through the main operating portion of the machine, but drawn with it in the horizontal position instead of its inclined operating position to facilitate the description and conserve space on the drawing, and showing a finished work piece in place in a chuck;

Fig. 3 is a similar section on an enlarged scale of one of the work carrying spindles and associated elements showing the chuck released and a finished work piece being withdrawn;

Figure 7:
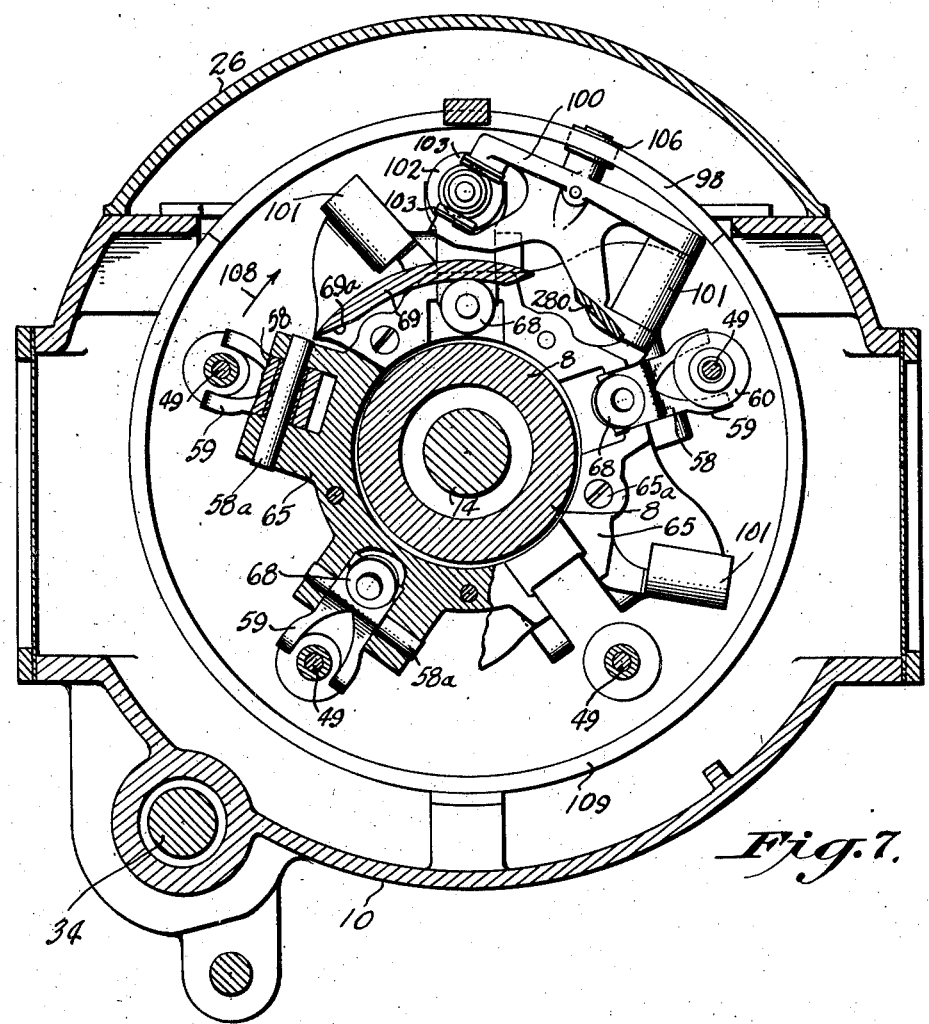
Figure 8:
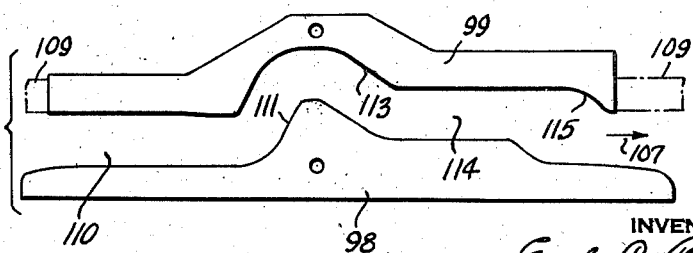
Figure 19:
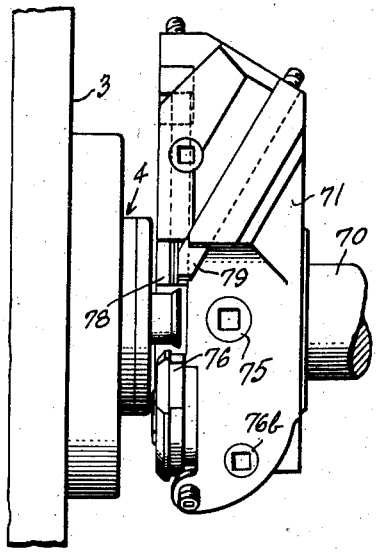
Figure 20:
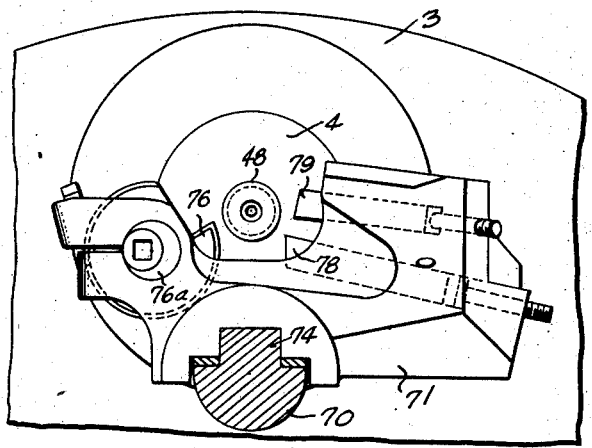
Figure 23:
Figure 24:
Figure 21:
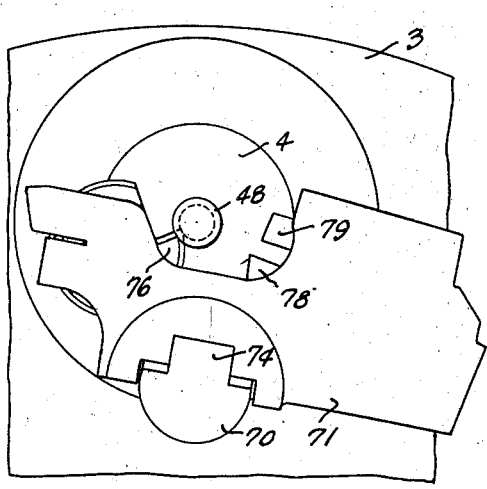
Figure 22:
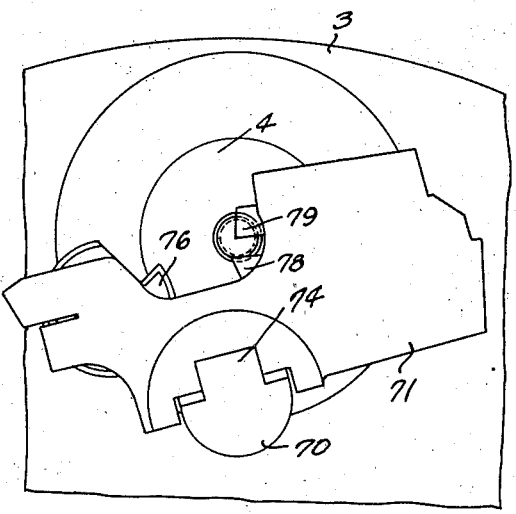
Figure 26:
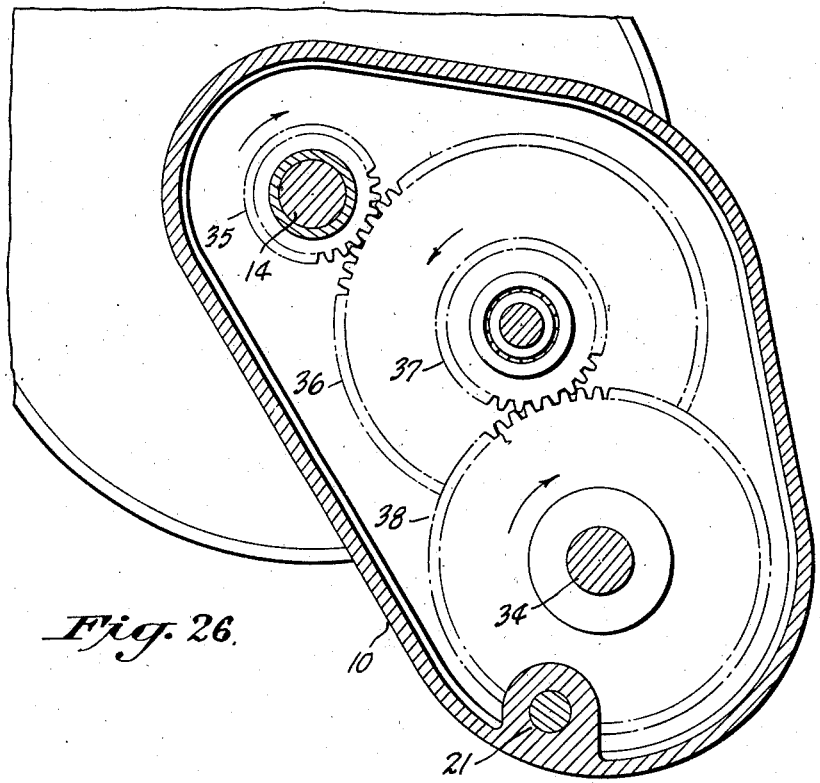
Figure 25:
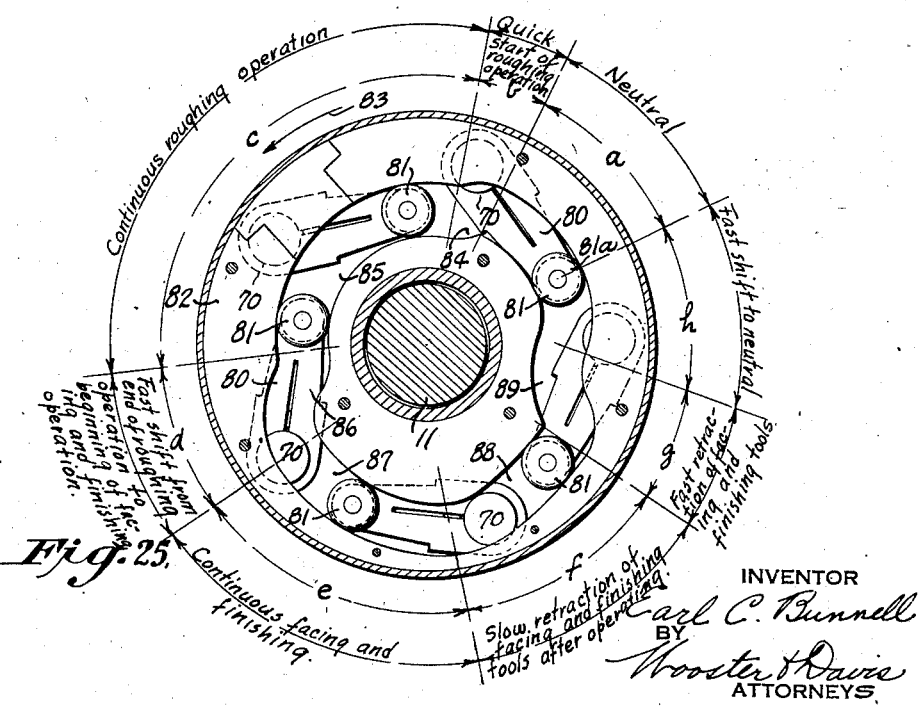
Figure 30:
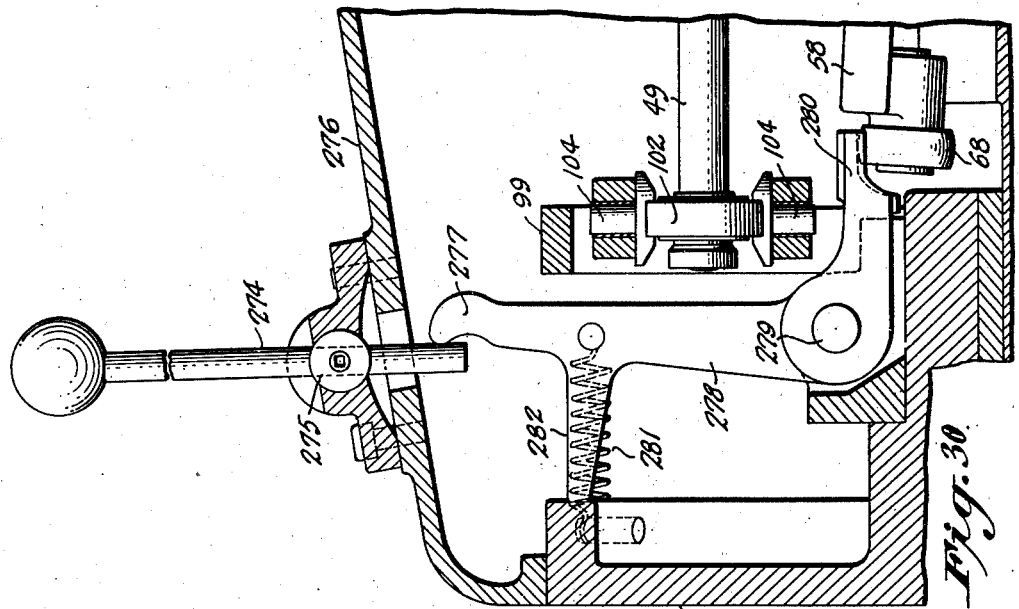
Figure 29:
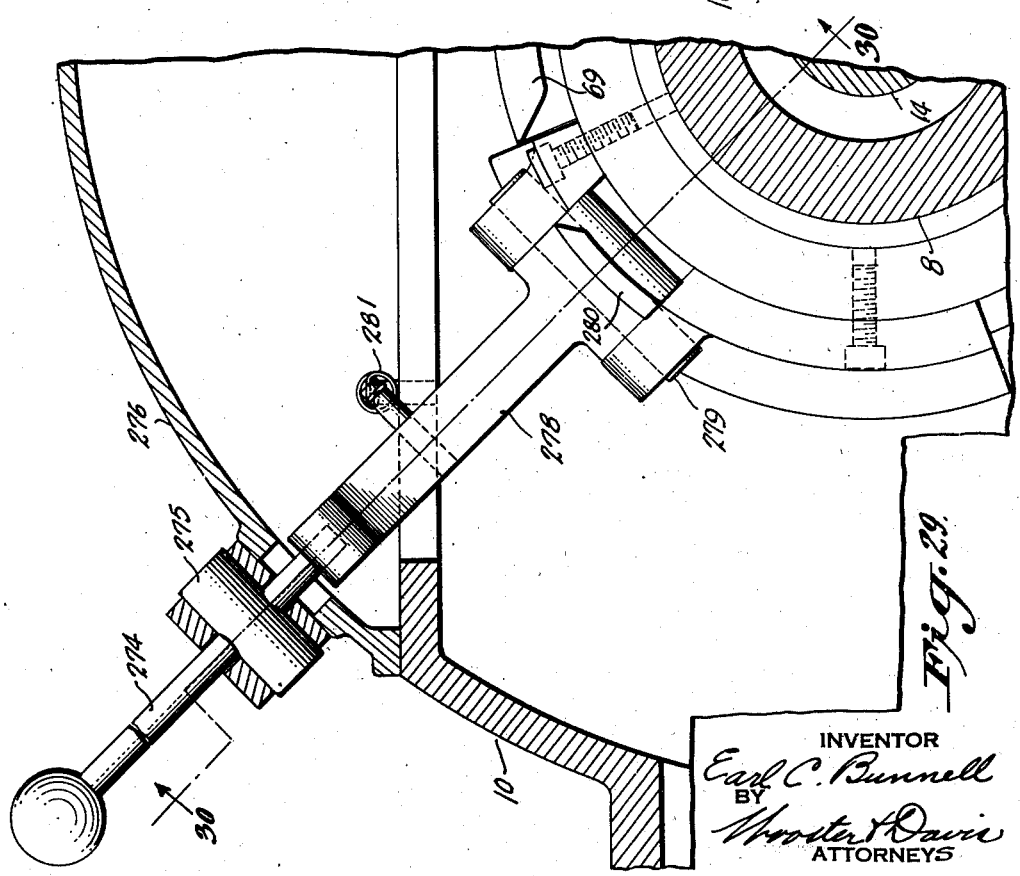

Figs. 4 and 5 are detailed sections substantially on line 4—4 and 5—5 respectively of Fig. 3;

Fig. 6 is a detailed section of the means for gripping the finished work and withdrawing it from the chuck, the section being substantially on line 6—6 of Fig. 3 but on a larger scale and the end of the shell or work piece being shown in elevation;

Fig. 7 is a transverse vertical section substantially on line 7—7 of Fig. 2 showing the opening means for the chucks partly in section and partly in elevation;

Fig. 8 is a development of the cam for operating the work ejector or knockout and stop or locating plunger and pilot;

Fig. 9 is a side elevation of a portion of the work feeding and loading device;

Fig. 10 is a section substantially on line 10—10 of Fig. 9;

Fig. 11 is a transverse section substantially on line 11—11 of Fig. 10;

Fig. 12 is a top plan view of a portion of the loading and unloading devices showing them in their neutral positions at the end of the unloading and beginning of the loading operations;

Fig. 13 is a partial elevation and a vertical section through the forward portion of the loading device;

Fig. 14 is a transverse section substantially on line 14—14 of Fig. 9 showing the forward end of the loading device in elevation;

Fig. 15 is a top plan view of a portion of the operating means for the loading and unloading devices, parts being broken away to more clearly show the construction;

Fig. 16 is a front elevation of the mechanism for operating the loading and unloading means;

Fig. 17 is a detailed elevation of the upper portion of the operating means for the release member of the feeding device;

Fig. 18 is a partial side elevation and partial section showing a portion of the cam shaft assembly, the drive for this shaft and the turret, and the operating cams and levers for the loading and unloading devices;

Fig. 19 is a top plan view of one of the tool holders showing it in the neutral position adjacent a work piece preparatory to starting a working operation;

Fig. 20 is a side view thereof looking from the right of Fig. 19 and showing its supporting shaft in section;

Fig. 21 is an outline view of this tool holder showing it swung to position for the roughing and turning tool to operate;

Fig. 22 is a similar view showing it swung in the opposite direction for the facing and finishing tools to operate;

Fig. 23 is a plan view of the end of the spindle showing the projected end of a work piece after operation of the roughing tool which is working in the position of Fig. 21;

Fig. 24 is a similar view showing the projecting end portion of the work after completion of the finishing operation;

Fig. 25 is a transverse section through the main shaft showing in elevation the operating cam and the associated levers for operating the tools, and indicating the sequence of operations;

Fig. 26 is a transverse section substantially on line 26—26 of Fig. 2 showing the drive for the cam shaft;

Fig. 27 is a partial side elevation and partial section through the operating means of a device for removing chips;

Fig. 28 is a section thereof substantially on line 28—28 of Fig. 27;

Fig. 29 is a partial transverse section and partial elevation of a hand operable mechanism for releasing a work-holding chuck for setting up and adjusting operations, and Fig. 30 is a section substantially on line 30—30 of Fig. 29.

General Arrangement

The machine comprises a base 1 on which is mounted the rest of the machine structure, including a trough 2 extending around at the sides and beneath a rotatable turret 3 carrynig the work spindles 4 and a tool carrier 5 for each spindle mounted in a barrel 6 mounted on and rotating with the turret. It is preferred that the turret be arranged with its axis inclined to the horizontal as indicated, for purposes which will later be described. The angle is not critical but preferably is about 28 or 30 degrees. The turret comprises two sections, a main section 7 and a supporting section 8 (Figs. 2 and 3), this latter section including a supporting bearing 9, in which it rotates, carried by the housing 10. The main section 7 of the turret is carried by a shaft 11 running in an antifriction bearing 12 in a supporting flange 13 mounted on the base 1. The main driving shaft is shown at 14 running in antifriction bearings 15 and 16 in the turret. The shaft is driven by a pulley 17 from an electric motor 18 through one or more belts 19. The motor is mounted in any suitable way, such for example as on a supporting bracket 20 pivoted to the housing 10 at 21 with suitable adjusting means (not shown) to swing the motor bracket to adjust tension of the belts 19. A hand wheel 22 is provided on the pulley 17 so that the machine may be operated by hand for setting up and adjusting purposes. The motor may be controlled from any suitable starter 23 and switches 24.

Mounted above the machine may be any suitable type of feed hopper 25 with a discharge chute 26 leading to the feeding and loading mechanism on the machine, later to be described. This hopper is not shown in detail as it forms no part of the present invention, but it includes some form of mechanism for agitating the work pieces in the hopper and controlling them so that they are fed to the chute 26 in the proper position, this mechanism being operated by an electric motor 27 driving the hopper mechanism through a suitable belt 28 running over a driven pulley 29. The hopper motor may be controlled from any suitable starter 25a and switches 25b.

The turret 3 carries a plurality of work-carrying spindles 4 of which there may be any desired number. In the present case there are five of these spindles continuously rotated during the operation of the machine through a pinion 30 on each spindle meshing with a gear 31 on the shaft 14. Therefore through this drive the spindles are driven from the shaft 14. The turret is rotated through a gear 32 on the turret meshing with a pinion 33 on a cam shaft 34 which is also driven from the main drive shaft 14 through a gear train comprising the pinion 35 meshing with an idler gear 36 secured to another pinion 37 meshing with the gear 38 on the shaft 34. This train of gearing is shown more clearly in Figs. 2, 18 and 26. The ratio of the gears 32 and pinion 33 is 1 to 5 so that the turret carrying five work spindles makes one revolution for five revolutions of the cam shaft 34, the cam shaft making one rotation for each unloading and loading operation for each of the five spindles as they come to the unloading and loading positions, as will later be described.

Work Spindle and Chuck Construction

The work spindle 4 and chuck construction is shown more clearly in Figs. 2 to 8. The spindle includes a hollow member 39 on which the pinion 30 is formed and which member 39 is mounted to rotate in the antifriction bearings 40 and 41 in the turret, the bearing 40 being a combined radial and thrust bearing so that it is always in the same relative location in the turret. A nut 43 threaded on the end of the spindle holds the inner member of the bearing in place and co-acts with a seal 44 between this nut and a cap 43a on the turret to prevent leakage of oil. It also carries a cover plate or cap 45 extending over the end of the spindle and the chuck.

The work holding chuck comprises a collet 46 slit at its forward end to form a plurality of jaws 47 to grip the work 48, in the present showing a machine-gun shell, although of course it may be other articles, on which various operations are to be performed. The inner or gripping surfaces of the jaws are relieved by longitudinal grooves 47a forming ribs to engage the work piece and provide a better grip. The collet 46 embraces the spindle or rod 49 and is pinned to the spindle 39 so as to rotate therewith and is otherwise held stationary with respect to the spindle by a transverse pin 50. Mounted between the collet 46 and the spindle 39 is a longitudinally slidable sleeve 51 having elongated slots 52 through which the pin 50 extends so that the sleeve may have limited sliding movement relative to the spindle. At its forward end this sleeve is internally tapered at 53 to engage the external taper 54 on the clutch jaws 47. A heavy spring 55 embracing the sleeve 51 reacting against shoulders 56 and 57 on the sleeve and on the spindle respectively, tends to shift the sleeve forwardly onto the jaws 47 and by action of the tapers to compress these jaws and clamp them on the work. As the jaws 47 do not move longitudinally as they are clamped onto the work piece they do not tend to shift it out of position. The sleeve, however, is shiftable rearwardly or to the left as viewed in Figs. 2 and 3 to the position shown to release the jaws 47 and permit them to move outwardly under the resilient action of the metal of the collet to release the work. This release mechanism comprises a release lever 58 forked at 59 to embrace the rear end portion of the sleeve 51 and react against a collar 60 mounted on the sleeve through antifriction bearing 61 held on the sleeve by a collar 62 threaded thereon against which the bearing is held by a spring 63. A spring 64 embraces the spindle or rod 49 and reacts against the sleeve 51 and the collet 46 to tend to shift them in opposite directions and to always hold the collet against the pin 50 so that it is always retained in the same relative position in the spindle 39. The release lever 58 is pivoted in a spider 65 at 58a, the spider being carried by the section 8 of the turret and secured thereto by any suitable means such as screws 65a (Figs. 2 and 7). A spring 66 on a stud 67 passing through this lever tends to hold it against the thrust collar 60.

The lever is operated to release the chuck by shifting the sleeve 51 backwardly or to the left as viewed in Figs. 2 and 3, through a roller 68 carried by the lever and running onto the inclined portion 69a of a release cam 69 at a given time in the rotation of the turret to release the chuck and therefore release the work at the proper time for removal of the finished piece from the chuck. This cam 69 is of a length to hold the roller 68 depressed to keep the chuck open or released until a new or unfinished piece is inserted therein. The cam 69 is a stationary cam mounted in the housing 10 as is shown in Figs. 2, 3 and 7. There is a release lever 58 carried by the turret for each of the work spindles, and the cam 69 is located in the present case above the section 8 of the turret so that the chuck of each work spindle is released while that spindle is at the upper part of its movement which in the machine illustrated is the portion of this movement during which the unloading and loading operation takes place. It will be understood, if it is desired that the unloading and loading operations take place at some other part of the path of movement of the work spindle, the release cam 69 would be located accordingly.

After a work piece, such for example as the shell 48, (although the machine is not limited to use in finishing a shell but may be employed for performing other operations on numerous other types of articles) is inserted in the open chuck, the chuck closes to grip it, and as the turret continues to rotate the various operations are performed on the work piece by one or more tools which are carried around with the turret so that these operations are performed while the turret is rotating. The finished work piece is removed or unloaded from the chuck and a new or unfinished work piece is loaded in the chuck, also while the turret is rotating, so that in this machine the turret is rotating continuously at a uniform speed and is not stopped either for the unloading or loading of the work pieces, or for the various operations. The work pieces are also loaded in and removed from the chucks on the spindles while the spindles are rotating. It is therefore a continuously operating machine, and there is no stopping of the work spindles or the turret for the loading and unloading operations and the turret is not stopped for the working operations. Therefore no indexing mechanism is required for the turret, and the operations of starting and stopping the turret between different stations are eliminated, and the operations of starting and stopping the spindles at the loading and unloading stations is also eliminated. This greatly increases production.

TOOL OPERATING MECHANISM

The tools and the operating mechanism therefor for performing the various operations on the work pieces held in the chucks in the work spindles as the turret rotates are shown more clearly in Figs. 19 to 25, and their relation to their respective work spindle is shown in Figs. 2 and 3. As previously indicated, there is a tool holder and one or more tools associated with each work spindle and rotating with the turret so that each tool or set of tools for their respective spindle operates on the work held by the chuck in this spindle while the rotation of the turret carries the spindle and therefore the work piece with it from the loading to the unloading position. Each tool carrier comprises a bar 70 mounted in the barrel 6 carried by the turret, and mounted on the rearwardly projecting end of this bar is a tool holder 71. The bar 70 is mounted to turn in suitable bearings 72 and 73 in the barrel so that the tools may be moved toward and from the work piece carried by the chuck and also fed during the working operations. This projecting end portion is flattened and has a central rib 74 to seat in a similarly shaped recess in the lower part of the tool holder, the holder being secured to the bar by any suitable means such as the screw 75. There may be any desired number of tools, but in the present case three are shown, comprising the roughing tool 76 for rough turning a groove 77 (Figs. 23 and 24) in the end of the shell, a finishing tool 78 for giving a finishing operation to this groove, and a facing tool 79 for facing off and finishing the projecting end surface of the shell, as shown in Figs. 19 to 22. For convenience the roughing tool is located on one side of the work piece and axis of the spindle while the finishing and facing tools 78 and 79 are located on the opposite side. The tools can, therefore, be brought into working position and moved back from this position in succession by rocking the tool holder in opposite directions.

This is accomplished by means of a lever 80 (Figs. 2 and 25) on the forward end of the bar 70 carrying a roller 81 cooperating with a cam 82. The shape of this cam is shown in Fig. 25 to secure the desired operations on the work piece shown in the present instance. It will be understood this cam will be varied and shaped to correspond with the operations desired on any particular work piece on which the machine is operated. It will be seen from Fig. 25 that all of the tools are shifted to and from the operating position by this cam operating through the levers 80 as the rollers 81 carried by these levers follow around the cam as the turret rotates, the cam being stationary. The direction of rotation is that shown by the arrow 83, and the various operations and portions of the rotation of the turret and the tools during which these operations are performed are indicated by the sector notations in Fig. 25, these sectors indicating the position and travel of the rollers 81 on that portion of the cam during the operation noted.

Thus in the example illustrated, if we start with the roller 81a at the beginning of sector a, it is in the neutral position with the tools in their intermediate position of Fig. 20 in which all the tools are spaced away from the work piece 48 so that they will not interfere with unloading of the finished work piece from the chuck and loading or insertion of a new or unfinished work piece. As the roller 81a moves counterclockwise from the position of Fig. 25 through the sector of the arc a, the tools are held stationary in this neutral position, permitting unloading of the finished work piece and loading of an unfinished work piece. As it passes through sector b it runs down the portion 84 of the cam shifting the roller inwardly and swinging the tool holder to the right as shown in Fig. 20 to carry the roughing tool 76 into engagement with the work as shown in Fig. 21. As the roller runs through the sector c it is in the portion 85 of the cam, which is eccentric, gradually shifting the roller inwardly toward the center of the shaft, thus gradually shifting the tool toward the work. This is the feed for the rough turning operation. At the end of this movement the roller runs into portion 86 of the cam and the sector d which shifts the roller outwardly and rocking the tool holder in the opposite direction or counterclockwise as viewed in Figs. 20 to 22, giving a fast shift of the roughing tool 76 from the work and bringing the finishing tool 78 and facing tool 79 up to the work to begin their respective operations. The facing tool 79 performs its rough facing operation, that is, it moves inwardly toward the center while the roller is passing through the portion 87 of the cam in the sector e, this portion being eccentric to gradually shift the roller outwardly to feed the facing tool across the face of the work. As the facing tool approaches the end of its inward movement the finishing tool 78 engages the work to perform its finishing operation on the rough turned portion or groove 77 made by the roughing tool 76. Then the roller enters the portion 88 of the cam in the sector f which is eccentric and gradually moves the roller inwardly toward the center of the shaft to gradually feed the facing finishing portion of the tool 79 outwardly across the end surface of the work. It also shifts the finishing tool 78 away from the work. After the facing finish and the tool leaves the work the roller enters the portion 89 of the cam in sector g, rapidly moving the roller inwardly and rapidly shifting the facing and finishing tools away from the work. The roller then runs into the sector h which brings the tools to the neutral position for the unloading and loading operations as the roller again runs through the sector a while the work spindle is in the upper or neutral portion of its movement, as previously described.

The rearward or inner end of the bar 70 is recessed at 90 (Fig. 3) to receive a spring 91 on the reduced end of the pin 92 extending in a recess in the wall 93 of the turret and seating against the bottom thereof, so that the spring tends to push the bar 70 to the right to compensate for any looseness there might be and insure the tools are always in the same relative position to the chuck and the work carried thereby.

WORK KNOCKOUT AND GUIDING DEVICE

The knockout spindle or rod 49 (Figs. 2 and 3) is slidable within the spindle 39, more particularly within the sleeve 51 and the collect 46. At its forward end it carries the pilot 94 which forms a guide to direct the end of the work into the chuck and also engages the inner wall at the outer end of the shell to limit its inward movement and thus locate the work or shell before the chuck closes on it. The end of the pilot is tapered and it has spaced longitudinal ribs 94a to engage the inner side of the work piece 48. This reduces the surface engaging the work to make it easier for the work to free itself from the pilot and prevent its sticking to it. It also provides space for any chips or foreign matter which may be in the shell which might otherwise cause jamming. The pilot seats in a recess in the end of the rod 49 and is secured thereto by a cross pin 95. A spring 96 in the recess reacts against the inner end of the pilot and the pin 97 slidable in the rod reacts against pin 50 to form a resistance to the loading plunger 146 when the pilot is retracted and the work piece is being accurately positioned in the chuck. This prevents overthrow of the work piece under action of the plunger. This rod 49 is reciprocated at the proper time in the movement of the work spindles with the turret by the cams 98 and 99 placed side by side. A development of these cams is shown in Fig. 8.

The operating means between the cams and the rod as shown in Fig. 7 comprises a forked lever 100 pivoted to the spider 65 at 101 and carrying in the opposite forked end the antifriction bearing 102 (Fig. 3) on the end of the rod 49. The outer section of this bearing is carried in pivoted supporting fingers 103 carried by the arms of the lever 100, these fingers including studs 104 in bearings 105 in the arms of the lever so that the bearing 102 may turn as the rod 49 is shifted in and out by the angular movement of the lever 100. Mounted on this lever is a roller 106 (Fig. 7) to run between the cams 98 and 99 at the proper time to shift the rod 49. This roller runs into these cams while the work spindle is passing through its neutral position, which is the position of unloading the finished work piece from the chuck 47 and loading or inserting a new or unfinished work piece in the chuck. When the spindle is at the top of the turret the roller passes through these cams from left to right, as viewed in Fig. 8, and as indicated by the arrow 107, the spider moving clockwise as viewed in Fig. 7 and indicated by the arrow 108.

During the greater part of rotation of the turret and the spider 65 the roller 106 is above the safety cam 109 which has a straight surface, to thus prevent downward or forward movement of the rod 49 and keep it in position in the work spindle should no work piece be inserted in the chuck. As the work spindle enters the neutral zone the roller 106 runs into the portion 110 between the cams, and while it is therein the roller 68 on the clutch release lever 58 runs onto the cam 69 to release or open the chuck. Then the roller 106 runs onto the portion 111 of the knockout cam 98 which shifts the lever 100 and shifts the rod 49 to the right to the full line position of Fig. 3 carrying with it the finished work piece 48 and removing it from the chuck 47. The finished work piece, in this case the shell 48, either drops from the pilot into the unloading tube 198 or is drawn from the pilot by the gripping clamp 112 (Fig. 6) which will be later more fully described in detail. After passing over the hump 111 the roller 106 is forced in the opposite direction by the inclined portion 113 of the drawback cam 99 where it is forced backwardly, partially retracting the pushout rod 49 and with it pilot 94. The roller moves into the straight portion 114 which is in an intermediate position, leaving the outer end of pilot 94 projecting a short distance from the chuck to receive the open end of a new or unfinished shell or work piece 48 and to guide it into the chuck during a loading operation. Drawing the pilot back into this position draws it away from the finished shell which has just been removed to free the shell from this pilot so that there is no danger of its catching or hitting anything to jam or break something as the turret continues to rotate to carry the work spindle away from alignment with the unloading device. After the end of the new shell or work piece is slipped over the projecting end of the pilot it is drawn back into the chuck to guide the work piece into the chuck and limit inward movement of the work piece under action of the loading device, as will later be described. This backward movement is effected by roller 106 running into the portion 115 of the drawback cam 99. This movement would be imparted to the pilot even though no work piece was placed on the pilot or inserted in the chuck, so that the pilot would be drawn back into the chuck out of the way of the tool as the work spindle carrying this pilot moves around with the turret through the working positions. Thus should the loading apparatus fail to insert a work piece in any particular work spindle chuck, no harm would be done as the parts are moved out of the way of the tools and they would merely come up to and move back from the cutting positions, but of course without doing any work as there is no work piece in the chuck. In this fully retracted position rod 49 is drawn back so that the bearing 102, its supports 103 and the forked end of the lever 100 are in the dotted line position of Fig. 3.

FEEDING, LOADING AND UNLOADING MECHANISM

Figure 1:
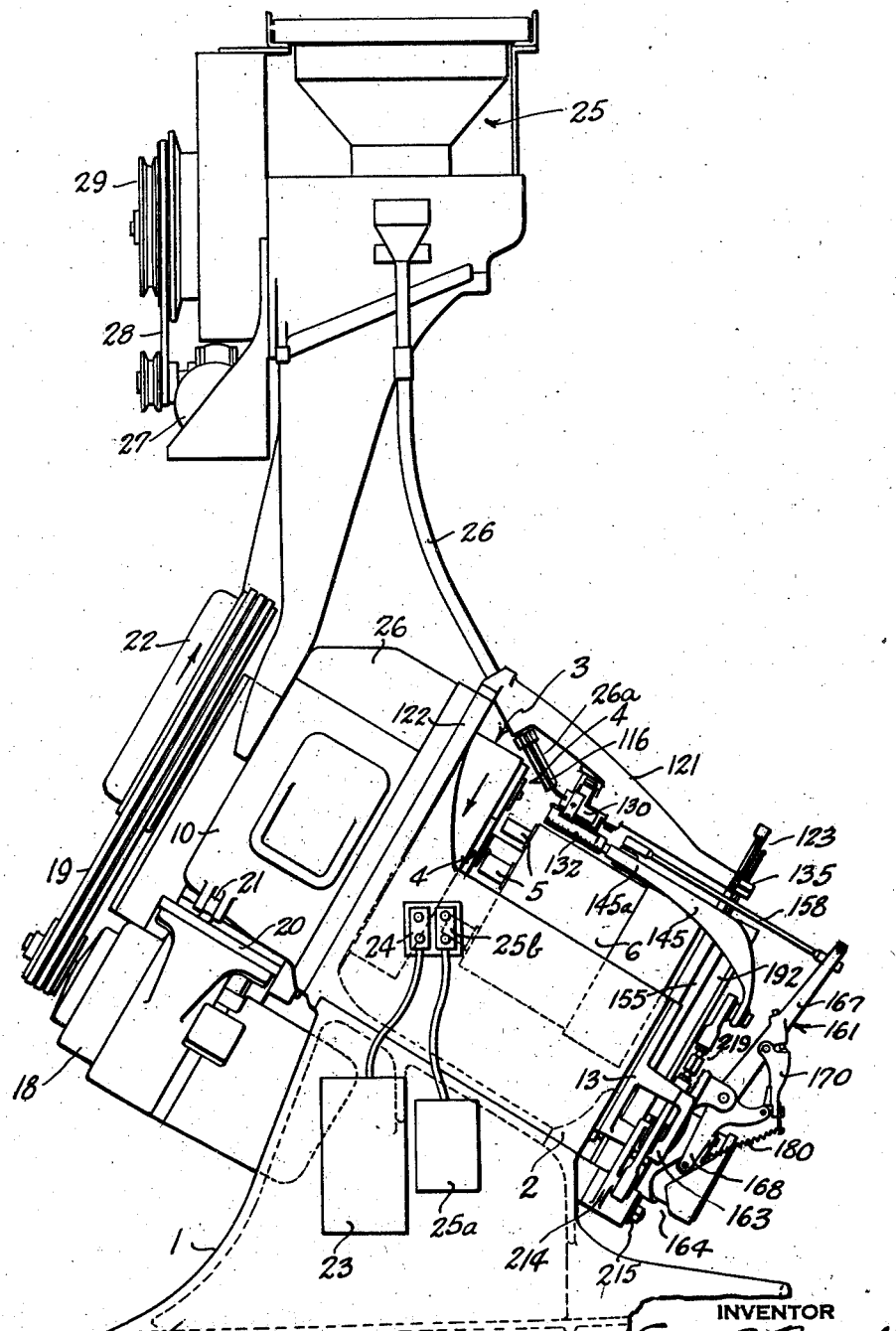
Fig. 1 is a side elevation of the machine.

The feeding, loading and unloading mechanisms are shown more clearly in Figs. 9 to 18, although their general relation to the turret and work spindles is shown in Figs. 1 and 2, and a portion of the unloading mechanism is shown in operation in Figs. 3 and 6. As previously described, the work pieces (in the present illustration the shells 48) are fed from the hopper 25 by gravity through the chute 26 leading to a position adjacent the upper part of the turret and the work spindle 4 in the turret at the upper or neutral position, as shown in Figs. 1, 2 and 9. Also, as previously described, while the work spindle is moving through this upper or neutral position the work holding chuck is open so that the finished work piece can be withdrawn or unloaded from it and a new or unfinished work piece inserted in it, after which the chuck closes and the work is carried around for the working operations. The lower end of the chute 26 is a separate tube 26a, and in this tube is a feed control mechanism comprising a release lever 116 pivoted to a bracket 117 at 118 mounted on the chute 26, which lever has a stop lug 119 (Fig. 10) projecting through an opening in the side of the chute to engage the end of and hold a work piece 48 in the chute, as indicated in Fig. 10. It will be understood that a series of these work pieces 48a, 48b, 48c and so on, resting one against the other, is in the chute 26 and retained therein by this release lever, as shown in Fig. 10. The lever is normally retained in the holding position by a spring 120 carried by the bracket 117. This lever 116 is operated by swinging it outwardly to release the work pieces 48 one at a time in certain timed relation with the loading device to supply these work pieces to the loading device at the proper time, as will be later more fully described. In the present case it is operated by the member 130 engaging the projecting end portion 116a. The lower end of the chute 26 is held in and supported by a bracket 121 supported at its upper end on the upright portion 122 of the trough 2 and is supported at its other end by an upright guard 123 (Figs 1 and 2). The tube 26a is clamped in the bracket by a slit portion 124 and clamping screws 125.

The work pieces from the chute tube 26a are discharged into a catcher 126 suspended from the arm 121 by the arms 127 and 128 secured thereto by any suitable means such as screws 129. Over the base portion 126 of the catcher is located a substantially inverted U-shaped release 130, normally in position over the base portion 126, as shown in Fig. 14, a work piece 48 being shown in broken lines in Fig. 14 in this release and resting on the base 126. This release member 130 is mounted on an oscillatable shaft 131 supported in the bracket 121. At one side of the base portion 126 is a cradle or trough 132 open at the top so as to receive the work piece 48 from the catcher 126 through action of the release member 130. The cradle or trough 132 is preferably made of some flexible resilient material, such for example as rubber or "neoprene," so that it may yield somewhat should a work piece need to be shifted slightly during the loading operation to thus adjust itself to conditions and prevent jamming. The release member 130 carries a flipper or guard 133 on one side thereof curved at its lower end over the top of the cradle 132, as shown in Fig. 14, to prevent the work piece tipping out of the cradle and also to guide it into the cradle when the member 130 is shifted laterally to carry the work piece 48 from the broken line position on the base 126 off the right hand edge thereof so that it will drop into cradle 132, as indicated in dotted lines Fig. 13, preparatory to the loading operation.

The release 130 is operated in certain timed relation with the loading operation by oscillation of the shaft 131 through a connecting rod 134 (Fig. 16) connected to an arm 135 on the shaft and to a lever 136 pivoted at 137 on the support 138 secured to the base. This lever carries a roller 139 running on a cam 140 on the main cam shaft 34. The upper end of the rod 134 passes through the arm 135 and carries an adjustable collar 141 against which it is yieldably held by a spring 142, so that should a work piece become jammed in the catcher the spring will merely yield, permitting the rod 134 to move relative to the arm 135 and prevent breaking of the mechanism. The roller 139 is held against the cam 140 by a spring 143. The cradle 132 (Figs. 9, 12, 13 and 14) is supported on a bushing 144 the outer end of which telescopes into the end of the cradle 132 and the other end of which is clamped in the split free end of the arm 145a of the bracket 145.

The portion of the loading mechanism cooperating with the cradle 132 for carrying a work piece from this cradle and inserting it in a chuck in a work spindle comprises a plunger 146 carried in a locater rod 147 adjustably mounted on the end of a pusher rod 148, this locater rod being adjustable longitudinally relative to the rod 148 by being threaded into it at 149 and locked in adjusted position by lock nut 150. By this means the locating rod or head 147 may be adjusted toward or from the rod 148 and with it the plunger 146 so that it will insert the work piece the proper amount in the open chuck when the pusher rod 148 is shifted forwardly under mechanism which will later be described. As shown in Fig. 13, the plunger 146 engages the work piece 48 to push this work piece out of the cradle 132 and onto the pilot 94 and into the chuck on the work spindle, an intermediate position being shown in broken lines Fig. 13 and the direction of movement indicated by the arrow 151.

The mechanism for reciprocating the pusher rod 148 is shown in Figs. 1, 15, 16 and 18. The rod 148 has a flattened portion 152 guided in a suitable and similarly shaped guide bearing 153 in the bracket 145 to prevent turning of the rod. The end of the rod may carry an adjustable stop screw 154 to engage the bracket to limit inward movements of the rod. The bracket 145 is mounted on an oscillatable ring 155 (Figs. 2 and 15), it being secured thereto by a flange portion 156 of the bracket through which passes securing screws 157. The pusher rod 148 is reciprocated by a connecting rod 158 connected at one end to the rod 148 by a universal connection 159, such as a ball and socket connection, and at the other end connected by a similar universal or ball and socket connection 160 to the operating lever 161 pivoted at 162 in the bracket 163 mounted on the base of the machine through the flange 13 secured to the trough 2. The bracket 163 may be secured to flange 13 by screws 163a. This lever is operated to reciprocate the plunger rod 148 in the loading arm 145a in certain timed relation with the other operations by means of a cam 164 on the cam shaft 34 in which a roller 165 carried by the other arm 166 of the lever 161 runs.

SAFETY LEVER

This lever 161 is a safety lever which "breaks" or yields should the work piece become jammed or the resistance to insertion of the work piece in the chuck exceed a certain limit, so as to prevent breakage of any part of the machine. As shown in Figs. 1, 16 and 18 the lever 161 comprises two sections, the upper section 167 and the lower section 168, both pivoted to the bracket 163 on the pivot pin 162. Therefore the two sections 167 and 168 may turn on the pin 162 independently of each other under certain conditions, but in normal operation are so connected that they operate as a single lever. For this purpose the lower section 168 includes an outwardly extending arm 169, and an auxiliary lever 170 is pivoted on the section 167 at 171. This lever 170 carries a bumper lug 172 engaging a spring pressed plunger 173 carried by the section 167, the spring 174 for this plunger being carried in a recess in the arm. On the other arm of this lever 170 is a block 175 engaging a roller 176 on the lever arm 169 spaced outwardly from the pivot 162, and this roller also normally rests against an adjustable stop screw 177 secured in adjusted position by a lock nut 178. This screw and nut may also be employed to secure to the lever 170 the finger 179 to which is connected one end of a spring 180, the other end of the spring being connected to a finger 181 on the lever section 168. This finger is secured by a lock nut 182 on an adjustable stop screw 183 on the lower arm of the lever section 168. This screw 183 is carried in a laterally extending lug 184, and is threaded therein so that it is adjustable, and overhangs and engages an extension 185 on the lever section 167 extending below the pivot 162.

The spring 180 normally holds the block 175 and the stop screw 177 against the roller 176, and the spring and plunger 174, 173 also tends to hold the block 175 and screw 177 against the roller 176. However, the lower edge of the block 175 engages the roller 176 above the line joining the center of the pivot 171 and the center of the roller 176 so that although during normal operation the two sections 167 and 168 of the lever 161 move together as a unit under the action of the cam 164, should the resistance to movement of the upper arm of the section 167 to the left as viewed in Fig. 18 (which is the action of forcing a work piece into a chuck) exceed a certain limit, the lever 170 will yield upwardly under camming action of the roller 176 on the block 175, permitting the roller 176 to pass under the block 175, as indicated in dotted lines Fig. 18. This action therefore "breaks" the lever or causes it to yield, and there may be mounted on the lower section 168 a microswitch 186, the projecting operating pin 187 of which engages a small cam 188 on the upper section 167, so that as the two sections move relatively to each other as the lever "breaks" or yields the cam will operate to throw the switch, the switch being connected by suitable wiring (not shown) to the electrical control mechanism for the drive motor 18. Therefore as the lever "breaks" or yields it stops the motor and the operation of the machine, preventing damage to any of the parts. The pressure at which the lever yields or "breaks" may be varied by adjusting the screw 178. Adjusting this screw will raise or lower the point of contact of block 175 on roller 176 relative to the line joining the center of pivot 171 and the center of the roller. The higher the point of this contact is the less the resistance it will stand without yielding. After the difficulty which caused the release of the safety lever has been corrected the lever may be thrown back to the normal position shown in full lines in Figs. 16 and 18 with the block 175 and screw 177 engaging the roller 176. It will be seen that with this construction no element is broken which needs replacing after the difficulty or abnormal condition has been corrected to again make the machine operative, but all that is required is to reset the safety lever 161 with the block 175 engaging the roller 176 as shown in Fig. 18.

It will be seen that as the cam 164 acting through the roller 165 shifts the lower section 168 of the lever to the right as viewed in Fig. 18, pressure of the roller 176 on the block 175 will swing the upper section 167 of the lever to the left to advance the loading plunger rod 148 and plunger 146 (Fig. 13) to insert a work piece in the chuck. As the lever 168 is swung in the opposite direction or to the left, as viewed in Fig. 18, by the cam 164, the stop screw 183 engaging the extension 185 of the upper section 167, will swing this section 167 to the right or forwardly as viewed in Fig. 18, thus shifting the plunger rod 148 to the right as viewed in Fig. 13, and withdrawing the loading plunger 146 to the neutral position preparatory to the next loading operation. However, this arrangement of the screw 183 on lever section 168 engaging the extension 185 on lever section 167 will allow the lower section 168 to swing outwardly or to the right as viewed in Fig. 18 without operating the section 167 when the release lever 170 yields to permit lever 161 to "break" as above described. Adjustment of screw 183 permits adjusting the relative positions of the two sections 167 and 168.

SWINGING MOVEMENTS OF THE LOADING AND UNLOADING DEVICES

As the work piece is inserted in the chuck during the loading operation while the turret is rotating, the loading device comprising the cradle 132 and the plunger 146 must move with the work carrying spindle and the chuck in this spindle and at the same speed as the movement of the spindle with the turret, so as to maintain the cradle and the plunger in alignment with the chuck during the loading operation. For this purpose the bracket 145 carrying the loading arm 145a, is mounted on the ring 155 which is mounted to turn about the longitudinal axis of the turret. This ring 155 is shown in Fig. 2 mounted on the antifriction bearing 189, carried by supporting flange 13. Thrust bearings 190 and 191 are provided on opposite sides of the ring 155 to take the thrust incident to the loading operation and also the thrust from the unloading device which is mounted on a second rotatable ring 192 mounted on the antifriction bearing 193, also carried by the supporting flange 13.

Mounted on this ring 192 is a bracket 194 including a plate or disc portion 195 secured to ring 192 by any suitable means such as screws 196, and also including an arm 197 (Figs. 12 and 15) projecting forwardly over the barrel portion of the turret. This arm carries the unloading tube 198 and the unloading grip 112 (Figs. 6 and 12). This unloading tube 198 is slidable in spaced bearings 199 at the free end of the arm 197, and 200 at the base of this arm. The tube is reciprocated backwardly and forwardly in these bearings by means of a connecting rod 201 (Figs. 15 and 16) having a universal ball and socket connection 202 at one end with a collar 203 clamped to the tube and connected by a similar universal or ball and socket connection 204 at the other end to the upper arm 205 of an operating lever 206 pivoted to the bracket 163 at 207. The lower arm 208 of this lever carries a roller 209 running in the same cam groove 164 (Fig. 18) as does the roller 165 on the operating lever 161 of the loading device. Therefore the loading and unloading devices are both operated by the same cam as the motions required are similar, but by placing the rollers 165 and 209 at different locations about the axis of rotation of the cam different timing may be secured for the two devices, it being shown in Fig. 16 that these two rollers are located on substantially opposite sides of the axis of rotation of the cam.

As the unloading operation is performed while the turret is rotating, the unloading device must move with this turret and the work spindle carried thereby from the chuck of which the work is being removed, so as to maintain the unloading device in alignment with this chuck during the unloading operation. That is the reason why the bracket 194 is mounted on the rotatable ring 192. The two rings 155 and 192 carrying the loading device and ring 192 carrying the unloading device are oscillated in certain timed relation with each other and with the movement of the turret by means of a cam 210 (Figs. 16 and 18) on the cam shaft 34. This cam has a cam groove 211 cut therein which runs the roller 212 on one arm 213 of a lever 214 pivoted to the base 1 at 215. Pivoted to the other arm 216 of this lever at 217 and 218 respectively are two link connections 219 and 220. The link connection 219 connects the lever 214 with an arm 221 of the loading bracket 145 at 222. The link connection 220 connects the lever 214 with the disk portion 195 of the unloading bracket 194, this pivotal connection being indicated at 223. The link connection 219 includes a turn buckle 224 by means of which the length of this link connection may be adjusted. The link connection 220 is a connection which may yield in one direction, comprising a rod 225 extending from the head member 226 and slidable in the block 227 with a spring 228 between the head member and the block tending to separate them and forming a yieldable connection to transmit motion from the lever 214 to the block 227 and the disk 195. However, there is a positive connection from the rod 225 to the block 227 in the opposite direction because of the nuts 229 on the rod and engaging the block. This yieldable connection in the opposite movement prevents the unloading device being jammed against the loading device in such a way as to cause damage when they are shifted to the neutral position.

It will be seen that because the loading bracket 145 and the unloading bracket 194 are both operated from the same arm of the lever 214, but that the connections 222 and 223 are on opposite sides of the center of rotation of the mounting rings carrying these brackets, they will be operated simultaneously in opposite directions. That is, when the cam 211 swings the arm 216 downwardly the bracket 194 carrying the unloading device will be swung to the right or clockwise as viewed in Fig. 16, while the bracket 145 carrying the loading device will be swung to the left or counterclockwise as viewed in this figure. For the same reasons, when the lever arm 216 is moved upwardly the unloading bracket 194 will be swung to the left or counterclockwise while the bracket 145 will be swung to the right or clockwise. Therefore the action of cam 211 on the lever 214 will simultaneously shift the unloading and loading devices toward and from each other and to and from the neutral loading and unloading positions.

UNLOADING DEVICE

The unloading tube 198 is held from turning in the bearings 199 and 200 by a guide pin 230 (Fig. 15) projecting from the bracket 194 on which a block 231 clamped to the tube 198 slides. A spring 232 forms a yieldable connection between the connecting rod 201 and this tube. It is connected to the block 203 by the finger 233 mounted on this block and to a collar 234 secured to the tube. A stop collar 235 is adjustably mounted on the tube, and the spring 232 retains the collar 203 against the stop collar 235. Movement from the connecting rod 201 rearwardly or to the left as viewed in Fig. 15 is therefore transmitted to the tube 198 through the spring 232, and should the tube jam or meet any above normal resistance the spring 232 will yield and prevent breakage or other damage. Movement of the connecting rod 201 to the right or forwardly will retract the tube 198 by engagement of the collar 203 with the stop collar 235.

Mounted on the rearward end of the unloading tube 198 is a gripping clamp 112 (Figs. 6 and 12). This comprises a block 236 slit at 237 so that it may be clamped to the tube 198 by suitable screws 238. It is also held in position by screws 239 threaded in the block and having reduced ends 240 extending into openings in the tube to thus positively locate the block on the tube. Mounted in slots in the side walls of the block are pivoted pawls 241, their pivots being indicated at 242. A gripping end 243 projects through an opening 244 in the side wall of the tube so that the pawls engage in the groove 77 turned in the end of the work piece, in this case the shell 48, so that as the tube 198 is retracted or drawn forwardly the pawls grip the work piece and withdraw it from the chuck 47 and pilot 94 into the tube 198 through which it drops by gravity and may be carried to any location desired, for example dropped into a box or other container (not shown). Pawls 241 are spring pressed pawls with springs 245 tending to shift the inner ends inwardly to engage the work, but will permit them to yield outwardly as the tube 198 and block 236 are moved forwardly over the work piece. The springs 245 may be conveniently mounted by the screws 239. It will be seen from Fig. 6 that the pawls 241 are double-ended pawls having two jaws 243 at each end. This is so that the pawls may be used much longer without replacement, because when a jaw 243 wears the pawl may be turned over to use the other jaw 243 at the same end. When both are worn the pawl may be reversed so as to use the jaws at the other end.

It will be understood that in the unloading operation the finished work piece, in this case the shell 48, is pushed forwardly out of the opened chuck by the pilot 94, operated by the knockout rod 49, into the open end of the tube 198 where it is gripped by the pawls 241 and then withdrawn by these pawls from the pilot as the pilot is retracted, and also the tube 198 is retracted.

CHIP REMOVING MEANS

Means is provided for positively removing chips from the tools and finished work before the work piece is unloaded. This is shown in Figs. 27 and 28. There is provided at the unloading station or just forwardly of it, an airblast nozzle (not shown, as it is of usual construction and forms no part of the present invention and is commonly employed in machine tools for blowing chips from the work and the tools at the end of the tool operations). The nozzle is mounted and directed to direct an airblast against the work and the tool at a given time to blow the chips away so that they will not be carried into the unloading mechanism. A valve 246 may be mounted on the machine housing and in a pipe from a source of compressed air to this nozzle or nozzles. It may have a projecting stem 247 engaged by an adjustable stop 248 on an arm 249 of a lever pivoted at 250. The other arm 251 carries a roller 252 running on a cam 253 on the cam shaft 34. This cam has a bump which will operate the lever to shift the stem 247 to open the valve at the proper time to blow a short blast of air onto the chips to remove them as the work and tools pass adjacent the nozzle. However, this air blast cannot be relied upon to always remove the chips, as the chips might be so curled as to be caught on a tool or some adjacent part. Therefore a sort of rake device is provided for positively gripping the chips and removing them.

This device comprises an arm 254 carrying a number of pins or teeth 255 forming a sort of rake which is swung down closely adjacent the tool at the end of the working operations, as indicated in dotted lines Figs. 27 and 28, and then shifted backwardly away from the tool to withdraw any chips which may have been caught on them. For this purpose the arm 254 is carried by a block 256 clamped to a rod 257 mounted for both turning and sliding movements in the bearings 258 in a cap member 259 mounted on the trough 2. Clamped on this rod 257 is a collar 260 and a block 261 spaced so that a roller 262 is located between them, and by operating on these members may shift the rod longitudinally. This roller is carried on a lever 263 pivoted at 264 and the other arm of which carries a roller 265 running in a cam groove 266 in a cam on the cam shaft 34. This cam is so shaped as to shift the rod 257 longitudinally at a given time to shift the rake 255 toward and from a position adjacent the finished work and the tools. To control movement of this rake down to the dotted line position a second cam 267 on the shaft 34 operates on a roller 268 carried by a lever 269 pivoted at 270, and carrying on its other arm a roller 271 engaging an elongated shoulder 272 on the block 261. It will be seen that as the roller 268 is forced outwardly or to the right as viewed in Fig. 28 by the cam, the other roller 271 is forced inwardly or to the left swinging the block 261 and the rod 257 to the right or clockwise as viewed in Fig. 28. This will swing the arm 254 and rake 255 from the dotted line to the full line position which is its normal retracted or inoperative position. It is swung to the left or dotted position by a spring 273 connected to the block 256 and tending to turn the rod 257 against the action of the lever 269, and it therefore holds the shoulder 272 against the roller 271 and the roller 268 against the cam 267, so that when the roller 268 runs onto a low part of the cam the spring 273 swings the rake 255 to the dotted line position adjacent the tool. Then after the rake reaches this position, the cam 266 operating through the lever 263 shifts the rod 257 and the rake 255 to the left as viewed in Fig. 27 to carry the rake away from the tool and with it any chips which may have been caught by the rake. These chips when freed from the tool will drop off the rake. During sliding movements of the rod 257 the roller 271 runs on the elongated shoulder 272. After the rake is drawn away from the work, the cam 267 operating through the lever 269 and the shoulder 272 will turn the rod 257 against the action of the spring 273 and swing the rake back to the full line or inoperative position. The operating cams for the rake are shaped and timed to operate this rake as described, after the cutting operations are completed on the work piece and the work spindle carrying this piece approaches the unloading position.

HAND RELEASE FOR CHUCKS

Hand operated means is provided for releasing the work holding chucks in the work spindles at a certain position in the rotation of the turret so that the chucks may be released for setting up or adjusting operations or for removing any undesirable piece of work from the chuck. This is shown in Figs. 29 and 30. It comprises a hand lever 274 pivoted at 275 on the cover 276 secured over an open top portion of the housing 10. The inner end of this lever engages the end 277 of a lever 278 pivoted in the housing at 279. The other arm 280 projects over the path of movement of the roller 68 on the release lever 58 (Fig. 3) of the chucks. This lever 278 is located just beyond the release cam 69 (Figs. 3 and 7) for the chucks so that if rotation of the turret is stopped just after the chucks are closed as they leave cam 69, which is just after the chucks leave the loading position, the chuck in this position may be opened by operating the lever 274, and through it the lever 278, to swing the arm 280 downwardly and in turn force down the roller 68 to operate the lever 58 to open the chuck as previously described. The lever 278 is normally held in the retracted position by the spring 281 connected to this lever and the housing 10, the backward movement of the lever being limited by a stop lug 282 thereon engaging the wall of the housing.

Operation

Feeding operation

As previously indicated the work pieces, in the present instance by way of example and for illustrative purposes the shells 48, are dumped into the hopper 25 and are automatically fed by this hopper in the proper arrangement into the feed chute 26. These work pieces are dropped one at a time from the lower end of the chute, this operation being controlled by the release lever 116 (Figs. 9 and 10). The projecting end 116a of this lever projects into the path of movement of the inner end of the release member 130 (Figs. 9 and 14), so that as the member 130 is oscillated to push a shell from the platform 126 to drop into the cradle 132, the lever 116 will be forced outwardly to release the lowest shell 48a (Fig. 10) permitting this shell to drop from the lower end of the extension 26a of chute 26. The movement of the member 130 to push the shells sidewise may be a rapid one so that it is back into the normal position of Fig. 14 before the shell has dropped from the chute so that the shell will drop into this member onto the platform 126, as indicated by the broken lines Fig. 14, but preferably the left leg portion of member 130 forms an abutment for the released shell and prevents it dropping onto platform 126 until member 130 returns to its normal position of Fig. 14. When the member 130 moves back to this position it releases the lever 116 permitting it to swing back to the position of Fig. 10 to stop and retain the next work piece 48b.

Loading operation

As the turret carrying the work spindles rotates continuously, that is, is not stopped and indexed between different work operations and work stations, the new and unfinished work pieces are fed into the chucks and the finished work pieces are unloaded or removed from the chucks while the turret is rotating and therefore while the work spindles are given a planetary movement in their circular path. Therefore the loading device and the unloading device are arranged to move with the work spindle at the same speed as the planetary movement of the spindle and in alignment therewith during the loading and unloading operations, and these operations are performed while the work holding chuck on that particular spindle is open or released. In the present machine these operations are performed while each spindle passes through the uppermost part of its path of movement and therefore while it is at the upper part of the turret, as illustrated in Figs. 2 and 3. The arc through which the work spindle passes during these operations is called for convenience the neutral position.

During these operations the rotation of the work spindles about their own axes is not stopped, but they continue to rotate throughout their entire planetary movement. As the loading and unloading devices must move with the work spindle during part of their planetary movement, these loading and unloading devices are mounted on supports which may oscillate about the longitudinal axis of the turret. As previously described, the loading device is carried in the bracket 145 which is mounted on the oscillatable ring 155 (Figs. 2 and 15). This ring is oscillated back and forth through the necessary arc by the lever 214 (Fig. 16) and the cam 210 (Fig. 16) through the link connection 219. In Figs. 12 and 16 the loading device is shown in its upper position, which is held stationary for a sufficient time for a work piece to be shifted from the catcher 126 (Figs. 13 and 14) to the cradle 132, which is carried at the rear end of the arm 145a of the bracket 145. The work piece 48 is now in the cradle 132, as shown in dotted lines Fig. 13. The bracket 145 and the loading device carried thereby remain in this position until the cradle receives the work piece and until the work spindle, which has just been unloaded (as will later be described) approaches a position in alignment with the open rear end; then the cam 210 starts to shift the bracket 145 to the left or counterclockwise, as viewed in Fig. 16, by swinging the lever 214 counterclockwise. This operation is performed and timed with movement of the turret so that as the work spindle carrying the empty chuck moves into alignment with the loading device and cradle 132 this cradle and the associated loading plunger 146 moves with the empty spindle at the same speed and in axial alignment with it, until the unfinished work piece has been shifted from the cradle 132 into the open chuck.

This operation of transferring the unfinished work piece from the cradle into the open chuck while the cradle is moving with the spindle is performed by the plunger 146 (Figs. 12 and 13) operated by the plunger or pusher rod 148 carried in the bracket 145. This rod is pushed forwardly for the loading operation by the link 158 (Figs. 15 and 16) through action of the lever 161 (Figs. 15, 16 and 18) operated from the cam 164 (Fig. 18). As the work piece, in this case the shell 48, is pushed forwardly from the cradle 132, its open end is pushed onto the end of the pilot 94 which is positioned to project a short distance from the open chuck, as shown in Figs. 12 and 13. The shell is shown on this pilot by broken lines in Fig. 13. The pilot forms a supporting, guiding and centering means for the open end of the shell and guides and centers it in the open chuck. Also, as this pilot rotates with the spindle it causes the shell to be rotated at the approximate spindle speed before the chuck closes on the shell and thus avoids slipping of the chuck on the shell and prevents wear of the gripping surfaces of the chuck. As the shell is pushed further into the chuck from the broken line position of Fig. 13 the pilot is withdrawn backwardly into the chuck by the knockout rod 49 (Fig. 3) through operation of the portion 115 (Fig. 8) of the cam 99 (Figs. 7 and 8).

This brings the pilot back to its normal position and draws it out of the way of the tools. When the shell reaches the proper position as determined by the loading plunger 146 the chuck jaws 47 (Fig. 3) are closed and clamped on the shell to grip it through action of the sleeve 51 which is forced forwardly by the spring 55. With this arrangement all the work pieces are positioned in the respective chucks by the same locating element so they are all located in the same relation to a given reference line, such for example as that determined by the limit stop 154 (Fig. 15) engaging the abutment 153. After this sleeve is released by the roller 68 running off the cam 69 (Figs. 3 and 7) the loading plunger 146 is now withdrawn from the shell by the action of the cam 164, the movement of the cradle 132 and bracket 145 counterclockwise with the turret is arrested and it is shifted clockwise, as viewed in Fig. 16, back to the upper position of Figs. 12, 13 and 16, preparatory to loading a work piece in the next succeeding work spindle carried into alignment with it by the continued rotation of the turret.

This work piece which has just been loaded into the chuck is now ready for the operations to be performed on it, and these operations are carried out by the tools which rotate with the turret, and the tools are brought to the cutting position and fed for the cutting operations and then shifted back away from the work during the movement of the work spindle from the loading around to the unloading position.

Tool operation

The various movements of the tools to and from the cutting positions and the feeding of the tools during the cutting operation are performed by the cam 82 (Figs. 2 and 25), and by the roller 81 on the arm 80 on the tool operating bar 70, there being one of these bars, lever and roller for the tools for each work spindle, as there is a set of tools for each work spindle mounted on the turret and moving with it. The operation of each set of tools on each work piece in the particular example illustrated is shown by the diagram of Fig. 25, but it is to be understood that this is by way of example only and for the work to be performed on this particular work piece or shell, and it will be evident that for different types of work pieces and for different operations to be performed thereon, this cam 82 and the tools operated thereby will be constructed and formed to perform the particular operation desired for the particular work piece involved, and, therefore, this machine is in no way limited to the particular work piece or particular operation illustrated. The tools are adjustably mounted in the holder so as to be properly set for the work involved. In the present showing the tools 78 and 79 are slidable and clamped in different positions, while the tool 76 is generally circular and is rotatably and eccentrically mounted by eccentric 76a which may be turned and then clamped by screw 76b.

As rather generally outlining the operations, the roller 81a and the tools operated thereby will be carried through a single cycle as the cycle of operations is the same for each set of tools, and for each individual spindle. In the position of Fig. 25 the work spindle associated with the tool operated by roller 81a has just entered the neutral position at the top of the turret at about which point the work holding chuck in this spindle is released or opened by the cam 69 (Fig. 3) preparatory to the unloading and loading operations. As the roller 81a passes through this sector indicated by a, Fig. 25, the tools are held in the neutral position of Fig. 20 out of the path of movement of the unloading and loading devices (the unloading device will presently be described) during which the spindle moves through this neutral position and the new work piece is inserted in the open chuck, as above described. After this work piece is clamped in the chuck the roller 81a passes through the sector b at which time the portion 84 of the cam quickly moves the roughing tool 76 up to the work. Then the roller passes through the sector c and the portion 85 of the cam which is eccentric and gradually feeds the roughing tool forwardly for the rough turning operation. Then the roller passes through the sector d and the portion 86 of the cam which swings the tool holders in the opposite direction or counterclockwise as viewed in Figs. 20 to 22 with a rapid movement to carry the roughing tool 76 away from the work and bring the finishing tool 78 and facing tool 79 up to the work. As the roller passes through the sector e it passes through the eccentric portion 87 of the cam which feeds these tools forwardly for the continuous finishing and facing operation, then the roller passes through the sector f and portion 88 of the cam, which is inclined in the opposite direction, slowly retracting the finishing and facing tool in the opposite direction, during which the finishing portion of the facing tool performs its operation. Then the roller passes through the sector g and the steep portion 89 of the cam which performs a fast retraction of the facing and finishing tools from the work, and as the roller passes through the sector h it shifts the tools back to intermediate or neutral position at the end of the cycle.

The spindle carrying this finished work piece is now approaching and entering the neutral zone, or neutral part of its travel, at the top of the turret, at which time the cam 69 (Fig. 3) operates the lever 58 to shift the sleeve 51 to the left as viewed in Fig. 3 to open the chuck and release the finished work piece.

Unloading operation

As the turret approaches this position the cam 210 (Fig. 16) acting through the lever 214 by swinging it clockwise, through the link connection 220 turns the disk 195 and with it swings the bracket 194 to the left or counterclockwise bringing the unloading tube 198 into alignment with this spindle carrying the finished work piece and moves this tube with the spindle at the same speed and in alignment with it for a short distance. During this time while the tube is in alignment with the work on the spindle the portion 111 of the cam 98 (Fig. 8) acting through the lever 100 (Fig. 7) shifts the knockout rod 49 (Fig. 3) forwardly as viewed in this figure to the position shown, carrying with it pilot 94 and the finished work piece 48 into the open end of the tube 198. During this operation the tube 198 is shifted backwardly or to the left as viewed in Figs. 3, 6 and 12, to receive this work piece through the action of the connecting link 201 (Fig. 15) and lever 206 operated by the cam 164 (Fig. 18). The combined action of the outward or forward movement of the knockout rod 49 and pilot 94 and the rearward movement of the unloading tube 198 carries the grooved end 77 of the finished shell into the tube 198 and past the pawls 241 (Fig. 6) causing the pawls to grip the work piece, in this case by the jaws 243 entering the groove 77. The knockout rod 49 and pilot 94 are now drawn backwardly by the cam 113 (Fig. 8) to the intermediate position, indicated by the straight portion 114 of the cam, and with the pilot in an intermediate position projecting a short distance from the chuck, as shown in Figs. 9, 12 and 13. At the same time the unloading tube 198 is retracted or drawn forwardly, that is shifted to the right, as viewed in Figs. 3, 6, 12 and 15, by the lever 206 and the cam 164, carrying with it the gripping clamp 112 and the pawls 241 which will remove the finished work piece from the pilot. As the tube 198 is inclined downwardly from this gripping clamp the work piece drops down under the action of gravity and may be discharged into any suitable container (not shown).

As the turret continues to rotate the work spindle from which the finished piece has just been removed is carried into alignment with the loading device and the cradle 132 (as shown in Figs. 9, 12 and 13) which has been shifted to its upper position preparatory for this action during shifting of the unloading device during the unloading operation. The empty work spindle and chuck is now in alignment with the loading device which moves forwardly with the chuck under action of the cam groove 211 (Fig. 16) and the loading operation is performed as above described. It will be seen from Fig. 16 that as both the loading device and the unloading device are operated from the same cam 210 through the same lever 214 they operate together but in opposite directions through the action of link connections 219 and 220. That is, as the bracket 194 carrying the unloading device is shifted to the left or counterclockwise (as viewed in Fig. 16) during the unloading operation, the bracket 145 carrying the loading device is shifted to the right or clockwise, bringing this loading device up to the position preparatory for the loading operation. Then after the unloading device has performed its operation of removing the finished piece from the chuck and this empty chuck moves into alignment with the loading device, the lever 214 is swung in the opposite direction or counterclockwise. This through the connection 220 swings the unloading bracket 194 to the right or clockwise bringing it to position preparatory to the next unloading operation, and at the same time through the link 219 swings the loading bracket 145 and the loading device to the left or counterclockwise to carry it along with and in alignment with the empty chuck during the loading operation. While the empty chuck and work spindle is moving from alignment with the unloading device into alignment with the loading device these two devices are held stationary by the cam 210, which is the position of Figs. 12 and 16, and during this time a new or unfinished work piece is fed to the cradle 132, as previously described, for the next loading operation.

*Chip removal*

The operation of the chip removal device illustrated more clearly in Figs. 27 and 28 was described above in connection with the description of this device. Detailed description of the operation will therefore not be repeated. It is, however, to be noted that the operating cams 266 and 267 are so shaped and timed as to operate this chip removing device after the cutting operations on the work piece have been completed and the work spindle carrying this piece approaches the unloading position, so that should any chips not have dropped from the work or tool or been blown from it by airblast, this device will positively engage them and remove them from the work. At this time also the tools are swung to the neutral position so that the chips are easily cleared. As the spindle carrying the finished work piece approaches this position, indicated by the broken lines Figs. 27 and 28, the cam 266 shifts the rod 257 and the rake to the right or rearwardly as shown in Fig. 27 to the dotted line position immediately in front of the work and work tools, and then the cam 267 releases the lever 269 permitting the spring 273 to swing the rake downwardly to the dotted line position of Fig. 28 in front of the work and the tools to engage any chips which may be held by the tools. The cam 266 then shifts the rod 257 and the rake forwardly or to the left as viewed in Fig. 27, removing the chips from the tool and permitting them to drop off the rake. Then the cam 268 swings the rod 257 and the rake back to the normal or full line position.

*Safety release of loading device*

The release of the safety operating lever for the loading device illustrated in Figs. 16 and 18 has also been described in detail above in connection with the description of the mechanism involved, and therefore will now be only briefly outlined. Should the work piece in the loading device jam, as for instance should it be too large or be out of proper alignment with the open chuck, or for any other reason the resistance to operation of the loading device and shifting of the rod 148 exceed a certain amount the operating lever 161 (Figs. 1, 16 and 18) for this device will yield or "break" as previously described. That is, if the resistance to swinging of the upper section 167 of this lever to the left or counterclockwise as viewed in Fig. 18 exceeds a certain amount, then the pressure of the roller 176 on the block 175 becomes sufficient to cam this block off the lever, as indicated in dotted lines. This means that under these conditions the cam 164 swings the lower section 168 of the lever counterclockwise without shifting the upper section 167 as the block 175 no longer holds the roller, and the screw 183 carried by the section 168 can move to the right away from the extension 185 on the section 167. Therefore the cam operates the lower section of the lever and the lever yields without operating the upper section of the lever so that no element or part is broken and no damage is done. With the microswitch 186 as shown in Fig. 16 associated with this lever and carried by one section and operated by the cam 188 carried by the other section so that as the lever "breaks" or yields power to the operating motor is cut off, the machine will automatically stop as soon as the lever yields so that no damage can be done. As soon as the difficulty has been corrected the safety lever 161 can be reset, as indicated in full lines Fig. 18, and the machine operated as before.

*Hand release*

Should it be desired to release any chuck in any work spindle for purposes of removing the work therefrom or for setting up or adjusting, this may be done by the device shown in Figs. 29 and 30. The machine may be stopped by opening the control switch when the spindle involved is in alignment with the device of these figures, that is, shortly after the chuck control roller 68 (Figs. 2, 3 and 7) leaves the cam 69 and comes in alignment with the lug 280 on the lever 278, or the turret may be rotated by hand through the hand wheel 22 (Figs. 1 and 2) bringing the spindle to this position. Then by operating the lever 274 the lever 278 may be operated to depress the roller 68 and thus operate the lever 58 to shift the sleeve 51 and release the chuck.

It will be seen from the above that this machine operates continuously, the turret being rotated continuously, as viewed from the front or looking from the right in Figs. 1 and 2, to the left or counterclockwise. The tools for performing the work operations on the work piece in each work spindle are also mounted on the turret and rotate with it so that the working operations are performed on the work pieces while the turret rotates to carry the individual work spindles and the work pieces carried thereby from the loading position around to the unloading position, which incidentally is the greater portion of the path of movement of the work spindles so that plenty of time is provided for performing the working operations. After the working operations are completed, the tools are swung to a neutral position and the work holding chuck carrying the finished work piece is automatically opened, the finished piece removed from the chuck, the unloaded opened chuck is shifted to alignment with the loading device and a new and unfinished work piece inserted in the open chuck and then clamped thereby for the working operation, all performed automatically as the turret continues to rotate. The unloading and loading operations are performed while the work spindles also continue to rotate about their axes so that there is no stopping of either the work spindles or the turret for the unloading and loading operations or for the working operations, doing away with the necessity of stopping and starting the spindles and the turret between each operation and doing away with indexing mechanism. This greatly increases the productive capacity of the machine.

It is also preferred, as indicated in Fig. 1, that the turret be inclined to the horizontal with the forward end lower than the opposite end. The angle of inclination is not critical, but is preferably about 28 or 30 degrees. In this arrangement the work pieces automatically position themselves by gravity, always in the same position in the loading device. That is, they automatically lie back in the carrier or cradle 132 so that a separate device to force or hold them back in this position is not required and they are automatically properly located. It is also easy to feed the pieces to the loading device as they slide by their own weight through the feed tube and for the same reason they slide by their own weight through the unloading or discharge tube 198 into any suitable container or receptacle provided to receive them.

Having thus set forth the nature of my invention, what I claim is:

1. In a machine of the character described, a rotatable turret, a plurality of work carrying spindles mounted in the turret, tools for performing work on work pieces carried by the spindles, means for feeding work pieces to the spindles and removing them therefrom while the turret is rotating, and means mounting the feeding and removing means so that they move with the turret in alignment with a spindle during the feeding and removing operations respectively.

2. In a machine of the character described, a rotatable turret, a plurality of work carrying spindles mounted in the turret, tools for performing work on work pieces carried by the spindles, means for feeding work pieces to the spindles, means for removing work pieces from the spindles, and means for shifting said feeding and removing means with the spindles during the feeding and removing operations so that these operations are performed while the turret is rotating.

3. In a machine of the character described, a rotatable turret, a plurality of spindles on the turret, a work carrying chuck on each spindle, feeding means for carrying work pieces to and inserting them in the chucks, tools for operating on the work pieces during rotation of the turret, discharge means for removing finished pieces from the chucks, means for moving the feeding and discharge means with the spindles during the feeding and discharge operations so that they can be performed while the turret is rotating, and automatic means for releasing and closing the chucks in timed relation with the feeding and discharge operations.

4. In a machine of the character described, a turret mounted to rotate about an inclined axis, a plurality of spindles mounted in the turret, work holding chucks at the lower ends of the spindles, means located below the chucks for loading work pieces in the chucks comprising a carrier inclined similarly to the spindles including a stop against which a work piece in the carrier automatically rests and is positioned because of said inclination and means movable toward and from the chucks for transferring a work piece from the carrier to the chuck, and means located below the chucks for receiving and conducting finished work from the chucks and inclined similarly to the inclination of the spindles.

5. In a machine of the character described, a turret mounted to rotate about an inclined axis, a plurality of spindles mounted in the turret, work holding chucks at the lower ends of the spindles, means for loading work pieces in the chucks and means for removing finished work from the chucks, both said means being inclined similarly to the inclination of the spindles, means for shifting the loading and removing means to move with the turret in alignment with a spindle during the loading and removing operations respectively, and tools movable with the turret for operating on the work pieces in the chucks.

6. In a machine of the character described, a rotatable turret, means for continuously rotating the turret, a plurality of work carrying spindles carried by the turret, means for loading work pieces into the spindles and unloading finished pieces from the spindles, means mounting the loading and unloading means to move with the turret so as to load and unload the work pieces during rotation of the turret, and tools mounted to move with the turret for performing work operations on the pieces while they are moving from the loading to the unloading position.

7. In a machine of the character described, a continuously rotating turret, a plurality of spindles carried by the turret, a work holding chuck carried by each spindle, means for automatically opening each chuck as its spindle passes through a neutral position in its path of movement, means movable with each spindle for removing a finished work piece from the chuck and inserting a new piece in the chuck while the spindle is in its neutral position, and tools movable with the turret for performing work operations on the pieces during their movement from the loading to the unloading position.

8. In a machine of the character described, a rotatable turret mounted to turn about an inclined axis, means for continuously rotating the turret, a plurality of spindles mounted in the turret, a work holding chuck at the lower end of each spindle, means forwardly of the chucks for loading work pieces into the chucks and unloading finished pieces from the chucks, means mounting the loading and unloading means so that they move with the turret to load and unload the work pieces during rotation of the turret, and tools mounted to move with the turret so as to perform work operations on the pieces while they are moving from the loading to the unloading position.

9. In a machine of the character described, a rotatable turret mounted to turn about an inclined axis, means for continuously rotating the turret, a plurality of spindles mounted in the turret, a work holding chuck at the lower end of each spindle, means forwardly of the chucks for loading work pieces into the chucks and unloading finished pieces from the chucks, means for shifting the loading and unloading means with the turret and in alignment with each chuck during the loading and unloading operations, and tools mounted to move with the turret for performing work operations on the pieces during their movement from the loading to the unloading position.

10. In a machine of the character described, a rotatable turret, means for continuously rotating the turret, a plurality of spindles carried by the turret, a work holding chuck mounted in each spindle, means for continuously rotating the spindles, means movable with the turret for loading work pieces in the chucks and unloading finished pieces from the chucks during movement of the turret, and tools movable with the turret for performing work operations on the pieces during their movement between the loading and unloading operations.

11. In a machine of the character described, a continuously rotating turret, a plurality of work spindles carried by the turret, a work holding chuck in each spindle, a loading device and an unloading device forwardly of the spindles for inserting an unfinished work piece in the chuck and receiving a finished piece from the chuck, a support for the loading device and a support for the unloading device each mounted to turn about the axis of the turret, means for opening the chucks during a portion of their movement with the turret, means for shifting said supports in timed relation with the opening of a chuck to shift the loading and unloading devices with the chuck while it is in the open condition, means for operating the loading and unloading devices to insert an unfinished work piece in the chuck and remove a finished piece therefrom while they are moving with the chuck, and tools for performing operations on the work pieces during their movement between the loading and unloading operations.

12. In a machine of the character described, a rotatable turret, a plurality of work spindles carried by the turret, a chuck in each spindle, a main drive shaft, a driving connection from said shaft to each spindle, a cam shaft, a driving connection from the drive shaft to the cam shaft, a driving connection from the cam shaft to the turret, a loading device and an unloading device forwardly of the spindles, a support for the loading device and a support for the unloading device each mounted to turn about the axis of the turret, cam means on the cam shaft connected to said supports to turn them to shift the loading and unloading devices with a spindle during the loading and unloading operations, cam means on the cam shaft to operate the loading and unloading devices to insert a work piece in the chuck and receive a piece therefrom during their movements with the spindle, and tools for performing work on said pieces during their movement between the loading and unloading operations.

13. In a machine of the character described, a rotatable turret mounted to turn about an inclined axis, means for rotating the turret, a plurality of work spindles carried by the turret, a work holding chuck mounted at the lower end of each spindle, means located below the chucks for loading work pieces in and removing them from the chucks including a carrier inclined similarly to the inclination of the turret and provided with a stop against which a work piece in the carrier automatically rests and is positioned because of said inclination and means movable toward and from the chucks for transferring the work piece from the carrier to a chuck, and tools for performing work on the work pieces in the chucks.

14. In a machine of the character described, a rotatable turret, a plurality of work spindles carried by the turret, a work holding chuck in each spindle, means for feeding work pieces to the chucks comprising an inclined chute, a catcher at the lower end of the chute to receive the pieces therefrom, a loading device including a cradle at one side of the catcher, a movable release member for shifting a work piece from the catcher to the cradle, means mounting the cradle to move with a chuck as the turret rotates after the cradle receives a work piece from the catcher, a plunger for shifting the work piece from the cradle to a chuck, and means for operating the release member and plunger in certain timed relation.

15. In a machine of the character described, a continuously rotating turret, a plurality of work spindles carried by the turret, a work holding chuck in each spindle, an inclined chute for work pieces, a catcher at the lower end of the chute to receive work pieces therefrom, a cradle at one side of the catcher, a movable release member for shifting a work piece from the catcher to the cradle, a plunger to shift a work piece from the cradle into a chuck, means to shift the cradle after receiving a work piece with the turret in alignment with a chuck, and means to operate the plunger to transfer the work piece from the cradle to the chuck while it is moving with the turret.

16. In a machine of the character described, a continuously rotating turret, a plurality of work spindles carried by the turret, a work holding chuck in each spindle, a cradle forwardly of the spindles, means for feeding work pieces to the cradle, means mounting the cradle for movement back and forth to and from a position to receive the pieces from the feeding means, means for transferring a work piece from the cradle to a chuck, and means for shifting the cradle with the turret and maintaining it in alignment with the chuck during the transfer operation.

17. In a machine of the character described, a turret mounted to rotate about an inclined axis, means for continuously rotating the turret, a plurality of work spindles carried by the turret, a work holding chuck at the lower end of each spindle, means forwardly of the spindles for loading work pieces into the chucks including a cradle having an open end facing the chucks, means for feeding individual work pieces to the cradle, a pusher associated with the cradle to transfer a work piece from the cradle to a chuck, a support for the cradle and pusher mounted to turn about the axis of the turret, automatic means to open and close a chuck during a certain part of its movement, means for shifting said support to move the cradle in alignment with a spindle while the chuck on that spindle is open, and means for operating the pusher to transfer a work piece from the cradle to the chuck during said movement of the cradle.

18. In a machine of the character described, a continuously rotating turret, a plurality of work spindles carried by the turret, a work holding chuck in each spindle, a pilot in each chuck slidable longitudinally thereof, means forwardly of the spindles to load individual work pieces in the chucks comprising a holder and means to transfer a work piece from the holder to a chuck, means for moving the holder and transfer means with the turret and in alignment with a chuck during the transfer operation, and means for projecting the free end of the pilot from the chuck to receive one end of the work piece and retract it into the chuck to guide the work piece into the chuck.

19. In a machine of the character described, a turret mounted to rotate about an inclined axis, means for continuously rotating the turret, a plurality of work spindles carried by the turret, a work holding chuck at the lower end of each spindle, means forwardly of the spindles for loading work pieces into the chucks including a cradle having an open end facing the chucks, means for feeding individual work pieces to the cradle, a pilot in each chuck and having a free end projectable from the chuck, a plunger associated with the cradle to transfer a work piece from the cradle to the chuck, means for moving the cradle and plunger with the turret and in alignment with a chuck during the transfer operation, and means for shifting the pilot to project its free end from the chuck to receive the end of the work piece and then retract the pilot into the chuck with movement of the work piece to guide it into the chuck and locate it therein.

20. In a machine of the character described, a rotatable turret, a plurality of work spindles carried by the turret, a work holding chuck in each spindle, means for opening and closing the chucks, a pilot in each chuck, means for shifting the pilot forwardly when a chuck is open to force a work piece from the chuck and to project the pilot outside the chuck, means in front of the chuck for transferring work pieces to the projecting end of the pilot and inserting it in the chuck, and means for retracting the pilot with the work piece to guide it into the chuck.

21. In a machine of the character described, a continuously rotating turret, a plurality of work spindles carried by the turret, a chuck in each spindle, means for opening and closing the chucks at certain points in their movement, a pilot in each chuck, means for shifting the pilot forwardly when a chuck is open to remove a work piece from the chuck, a cradle in front of the spindles, means for feeding work pieces to the cradle, means for partially retracting the pilot after removing a work piece from the chuck to leave its free end projecting from the chuck, means for shifting the cradle with the turret to maintain it in alignment with a chuck, means for transferring a work piece from the cradle to the projecting end of the pilot during said movement and inserting it in the chuck, and means for retracting the pilot with the work piece to guide it into the chuck.

22. In a machine of the character described, a turret mounted to rotate about an inclined axis, means for continuously rotating the turret, a plurality of work spindles in the turret, a chuck at the lower end of each spindle, a slidable pilot in each chuck, means for opening and closing the chucks, means for shifting a pilot forwardly when its chuck is open to remove a work piece from the chuck, unloading means forwardly of the turret for receiving the work piece removed from the chuck, loading means forwardly of the turret for inserting another work piece into the chuck, means for shifting the unloading and loading means with the turret to keep them in alignment with the chuck during the unloading and loading operations, said loading means including a carrier in alignment with the projecting end of the pilot and means for transferring the work piece from the carrier to the projecting end of the pilot and inserting it in the chuck during its movement with the turret, and means for withdrawing the pilot with the work piece to guide it into the chuck.

23. In a machine of the character described, a rotatable turret, a plurality of work spindles carried by the turret, a work holding chuck in each spindle, an inclined feed chute for work pieces, a catcher at the lower end of the chute to receive the pieces therefrom comprising a base and an open ended and open bottomed release over the base arranged to receive a work piece from the chute through said open end, a cradle at one side of the base, means for shifting the release laterally to transfer a work piece from the base and permit it to drop through the open bottom to the cradle, and means for transferring the work piece from the cradle to a chuck.

24. In a machine of the character described, a rotatable turret, a plurality of work spindles carried by the turret, a work holding chuck in each spindle, an inclined feed chute for work pieces, a catcher at the lower end of the chute to receive the pieces therefrom, a cradle at one side of the catcher, said catcher including a movable member for transferring work pieces from the catcher to the cradle, a release member in the chute to retain the pieces therein, means for automatically opening the chucks at a certain time in their movement, loading means associated with the cradle for transferring a work piece therefrom to a chuck, means for operating the movable member and the loading means in certain timed relation with opening of the chuck, and said movable member and release member being so arranged that operation of the movable member will operate the release member.

25. In a machine of the character described, a turret mounted to rotate about an inclined axis, means for continuously rotating the turret, a plurality of work spindles carried by the turret, a chuck at the lower end of each spindle, an inclined chute for work pieces, means at the lower end of the chute to receive the pieces therefrom comprising a base and a release over the base, a cradle at one side of the base inclined similarly to the inclination of the turret, means for shifting the release to shift a work piece from the base to the cradle, a plunger for transferring the work piece from the cradle to the chuck, means for moving the cradle with the chuck and in alignment therewith during transfer of the piece to the chuck, and means for operating the release and the transfer means in certain timed relation.

26. In a machine of the character described, a turret mounted to rotate about an inclined axis, means for continuously rotating the turret, a plurality of work spindles carried by the turret, a chuck at the lower end of each spindle, means for automatically opening the chucks at a certain time in their movement, an unloading device comprising an open ended tube forwardly of the turret, means in the tube to grip a work piece, means for shifting the tube longitudinally toward a chuck to receive a work piece and shifting it away from the chuck to carry the work piece therefrom, and means for moving the tube laterally with the turret and in alignment with a chuck during the unloading operation.

27. In a machine of the character described, a turret mounted to rotate about an inclined axis, means for continuously rotating the turret, a plurality of work spindles carried by the turret, a chuck at the lower end of each spindle, a pilot in each chuck slidable longitudinally thereof, an unloading device including an open ended inclined tube forwardly of the turret, means for moving the tube laterally with the turret and in alignment with a chuck while the chuck is open, means for shifting the pilot forwardly to project a work piece from the chuck, means for moving the tube longitudinally toward the chuck to receive the work piece and then shift the tube forwardly, and a pawl in the tube to grip the work piece and withdraw it from the pilot.

28. In a machine of the character described, a rotatable turret, a plurality of work spindles carried by the turret, said turret including an extension projecting forwardly of the spindles, a plurality of tool bars mounted for turning movements in bearings on the extension one for each spindle, a tool holder on each bar, a stationary cam mounted so that the turret rotates relatively thereto, and means on each bar cooperating with the cam through rotation of the turret to turn the bar to shift the tool holder.

29. In a machine of the character described, a continuously rotating turret, a plurality of work spindles carried by the turret, a chuck in each spindle, a support forwardly of the spindles movable with the turret, a plurality of tool bars carried by the support one for each spindle, means mounting the bars for turning movements in the support, a holder on each bar for a tool to act on a work piece in the adjacent chuck, a lever on each bar, a stationary cam mounted so that the turret rotates relatively thereto, and means on each lever running on the cam during rotation of the turret and the support and cooperating through such movement to turn the bar to shift the tool relative to the work.

30. In a machine of the character described, a rotatable turret, a plurality of work spindles carried by the turret, a chuck carried by each spindle, a reciprocable loading means for inserting work pieces in the chucks, means for operating said loading means comprising a lever including two sections pivoted together, yieldable means so connecting the two sections that they operate together as a unit during normal loading operations but capable of yielding should resistance to movement of the loading means exceed a given limit to permit the sections to move relative to each other so as to be ineffective to operate the loading means, and means for operating the lever.

31. In a machine of the character described, a rotatable turret, a plurality of work spindles carried by the turret, a chuck in each spindle, movable loading means for inserting work pieces in the chucks, means for operating said loading means including a lever comprising two sections pivoted together, cooperating cam means carried by the two sections to cause them to move as a unit during normal operation of the loading means, yieldable means holding said cam means together for said normal operation and capable of yielding to permit the sections to swing relative to each other so as to be ineffective to operate the loading means should the resistance to their movement as a unit exceed a certain limit, and means for operating the lever.

32. In a machine of the character described, a work spindle, a chuck carried by the spindle, a loading device for inserting a work piece in the chuck comprising a movable member, a lever for operating said member including two sections pivoted together, yieldable means connecting said sections to operate as a unit during normal operation, said yieldable means being adapted to yield to disconnect said sections so they operate independently and are ineffective to operate the movable member should resistance to operation of the loading device exceed a certain limit, and means for operating one section of the lever.

33. In a machine of the character described, a work spindle, a chuck carried by the spindle, a motor for operating the spindle, a loading device for inserting a work piece in the chuck comprising a movable member, a lever for operating the member including two sections pivoted together, yieldable means connecting said sections to operate as a unit during normal operation and adapted to yield to disconnect said sections so they operate independently should resistance to operation of the loading device exceed a certain limit, a control switch for the motor carried by one section, means on the other section to operate the switch by movement of the sections relatively to each other, and means for operating the lever.

34. In a machine of the character described, a work spindle, a chuck carried by the spindle, a loading device for inserting a work piece in the chuck comprising a movable member, a lever for operating said member including two sections pivoted together, cooperating cam means carried by the two sections so connecting them as to cause them to operate as a unit during normal operation of the loading means, yieldable means retaining said cam means in normal relation and adapted to yield to release the cam means to permit the sections to operate independently should resistance to operation of the loading device exceed a certain limit, and means for operating the lever.

35. In a machine of the character described, a work spindle, a chuck carried by the spindle, a loading device for inserting a work piece in the chuck comprising a movable member, a lever for operating said member including two sections pivoted together, a roller carried by one section, an auxiliary lever pivoted to the other section, a block carried by said latter lever engaging the roller at a point outwardly of a line joining the center of the roller and the pivot for said lever, a spring tending to retain the block in engagement with the roller to connect the sections to operate as a unit and adapted to permit it to ride over the roller should resistance to said operation exceed a certain limit, and means for operating one section.

36. In a machine of the character described, a rotatable turret, a plurality of work spindles carried by the turret, a chuck in each spindle, unloading means movable toward and from the chucks for removing a finished work piece therefrom, a loading device movable toward the chucks to insert an unfinished work piece therein, a cam provided with a cam surface, and independent operating means respectively cooperating simultaneously with different parts of said cam surface to operate the unloading and loading devices.

37. In a machine of the character described, a rotatable turret, means for continuously rotating the turret, a plurality of work spindles carried by the turret, a chuck in each spindle, an unloading means movable toward and from the chucks for removing a finished work piece therefrom, a loading device movable toward the chucks to insert an unfinished work piece therein, supports for said unloading and loading devices mounted to turn about the axis of the turret, a cam, means cooperating with said cam to turn said supports to move the unloading and loading devices with the turret and in alignment with a chuck during the unloading and loading operations, a second cam, and independent operating means cooperating respectively with different parts of the second cam to shift said loading and unloading means toward and from the chucks.

38. In a machine of the character described, a rotatable turret, a plurality of work spindles carried by the turret, a chuck in each spindle, tools for performing work on the work pieces in the chucks, an unloading device for removing finished pieces from the chucks, means movable to a position adjacent the tools after the working operations are completed to engage chips that may be on the tools, and means for shifting said means toward and from said chip engaging position to remove the chips from the tools prior to the unloading operation.

39. In a machine of the character described, a rotatable turret, a plurality of work spindles carried by the turret, a chuck in each spindle, tools for performing work on the work pieces in the chucks, an unloading device for removing finished pieces from the chucks, a rod mounted for longitudinal sliding and turning movements, a rake mounted on said rod, means for shifting the rod longitudinally to carry the rake to a plane adjacent the plane of the tools at the completion of the working operations, means for then turning the shaft to swing the rake to a position adjacent the tools to engage chips on the tools, and means for then shifting the rod longitudinally to carry the rake away from the tools to remove the chips.

40. In a machine of the character described, a rotatable turret, a plurality of work spindles carried by the turret, a chuck in each spindle, tools for performing work on the work pieces in the chucks, an unloading device for removing finished pieces from the chucks, means for removing chips from the tools between the work finishing and unloading operations comprising an arm having a series of teeth, means for mounting the arm for movement longitudinally of the axes of the spindles and lateral movement toward and from the tools, and means for moving the arm to cause the teeth to engage the chips and then shifting it longitudinally away from the tools to remove the chips therefrom.

41. In a machine of the character described, a rotatable turret, a plurality of work spindles carried by the turret, a work holding chuck in each spindle, means for opening the chucks at a certain location in their movement including a lever connected with the chuck and a stationary cam for operating said lever, and hand operated means for opening the individual chucks comprising a lever located adjacent and in alignment with the cam having means to engage said first lever when the latter lever is in alignment with it, and hand operated means for operating the second lever to open the chuck.

42. In a machine of the character described, a rotatable turret, a plurality of work spindles in the turret, means for rotating the spindles, a chuck in each spindle, means for automatically opening each chuck for insertion of a work piece and closing the chuck to grip the piece, means for inserting a work piece into the chucks, a pilot in each chuck and slidable therein so that its forward end may be extended to receive a work piece and guide it into the chuck, and said pilot being mounted to rotate with the chuck and to frictionally engage the work piece as it is being fed to the chuck to bring it up to substantailly the speed of the chuck before the chuck grips the piece.

43. In a machine of the character described, a rotatable turret, a plurality of work spindles in the turret, means for rotating the spindles, a chuck in each spindle, means operable while the spindle is rotating for automatically opening a chuck for insertion of a work piece and closing the chuck to grip the piece, means for inserting work pieces in the open rotating chuck, and means for rotating the piece at substantially the speed of the spindle prior to closing of the chuck.

44. In apparatus of the character described, means for moving a work piece along a closed orbital path, means for rotating said work piece on an independent axis of rotation during a period of its motion in said orbital path, means for feeding a work piece to said first-named means, means movable synchronously with said first-named means along said orbital path prior to said period of motion for injecting said fed work piece into said first-named means while said first-named means is in motion, means operative upon said work piece during its traverse in rotating condition along said orbital path for effecting cutting operations thereon, and means for ejecting said work piece from said first-named means upon completion of said cutting operations and while motion in said orbital path continues.

45. In apparatus of the character described, means for moving work pieces along an orbital path, means movable synchronously with said first-named means along a portion of said orbital path for delivering said work pieces one by one for insertion into said first-named means, means movable with and transversely with respect to said delivering means for inserting said pieces one by one into said first-named means while the latter is in motion and means for effecting tooling operations on each said inserted work piece as it is moved in said orbital path.

46. In apparatus of the character described, means for moving a work piece along an orbital path, means movable synchronously with said first-named means along a portion of said orbital path for delivering said work piece for insertion into said first-named means, means movable with and transversely with respect to said delivering means for inserting said delivered work piece into said first-named means while the latter is in motion and means for effecting tooling operations on each said inserted work piece as it is moved in said orbital path.

47. In apparatus of the character described, means for moving work pieces in a continuous manner along an orbital path, and means for delivering said work pieces one by one for insertion into said first-named means comprising, a member for receiving said work pieces one at a time and movable synchronously with said first-named means during a period of the movement of the latter, means for so moving said member synchronously, means operating on each individual received piece on said member during said synchronous motion for transferring the received work piece on said member to said first-named means, and means for effecting tooling operations on each said transferred work piece as it is moved in said orbital path.

48. In apparatus of the character described, means for moving work pieces in a continuous manner along an orbital path, and means for delivering said work pieces one by one for insertion into said first named means comprising, a member for receiving said work pieces one at a time movable synchronously with said first-named means during a period of the movement of the latter, means for so moving said member, means movable transversely of said orbital path and operable on each individual received work piece on said member during said synchronous motion for transferring the received work piece on said member to said first-named means, means for so moving said transversely movable means, and means for effecting tooling operations on each said transferred work piece as it is moved in said orbital path.

49. In apparatus of the character described, means for moving a work piece in a continuous manner along an orbital path, and means for delivering said work piece for insertion into said first-named means comprising, a member for receiving said work piece movable synchronously with said first-named means during a period of the movement of the latter, means for so moving said member, means movable transversely of said orbital path and operable on said received work piece on said member during said synchronous motion for transferring said work piece to said first-named means, means for so moving said transversely movable means, and means for effecting tooling operations on each said transferred work piece as it is moved in said orbital path.

50. In apparatus of the character described, means for moving work pieces along an orbital path, means movable synchronously with said first-named means along a portion of said orbital path for inserting said work pieces one by one into said first-named means while the latter is in motion, means for locating each inserted work piece properly for tooling operations thereon while each said work piece is in motion along said orbital path, and means for effecting tooling operations on each said work piece as it is moved in said orbital path.

51. In apparatus of the character described, means for moving a work piece along an orbital path, means movable synchronously with said first-named means along a portion of said orbital path for delivering said work piece for insertion into said first-named means, means movable with and transversely with respect to said delivering means for inserting said delivered work piece into said first-named means while the latter is in motion, means for effecting tooling operations on each said inserted work piece as it is moved in said orbital path, and means for unloading each work piece from said first-named means while motion in said orbital path continues.

EARL C. BUNNELL.

REFERENCES CITED

The following references are of record in the file of this patent:

UNITED STATES PATENTS

| Number | Name | Date |
| --- | --- | --- |
| 2,201,173 | Hanitz | May 21, 1940 |
| 2,328,002 | Gall et al. | Aug. 31, 1943 |
| 2,182,939 | Brinkman | Dec. 12, 1939 |
| 1,239,053 | Smith | Sept. 4, 1917 |
| 1,685,319 | Erdman | Sept. 25, 1928 |
| 2,233,398 | Carlin | Mar. 4, 1941 |
| 1,289,390 | Calleson | Dec. 31, 1918 |
| 1,574,726 | Bullard | Feb. 23, 1926 |
| 1,936,401 | Lovely | Nov. 21, 1933 |
| 1,947,171 | Prussing | Feb. 13, 1934 |
| 1,511,565 | Kinsley | Oct. 14, 1924 |
| 2,016,424 | Friden | Oct. 8, 1935 |
| 1,982,964 | Rupple | Dec. 4, 1934 |
| 2,051,159 | Witte | Aug. 18, 1936 |
| 649,903 | Brophy | May 22, 1900 |
| 2,082,081 | Rupple | June 1, 1937 |
| 1,767,224 | Mulka | June 24, 1930 |
| 2,102,567 | Brown | Dec. 14, 1937 |
| 2,140,019 | Lewis | Dec. 13, 1938 |
| 2,117,713 | Friden | May 17, 1938 |